(12) United States Patent
Hormis et al.

(10) Patent No.: US 11,368,209 B2
(45) Date of Patent: Jun. 21, 2022

(54) METHODS AND APPARATUS FOR FREQUENCY TRANSLATING REPEATERS

(71) Applicant: QUALCOMM Incorporated, San Diego, CA (US)

(72) Inventors: Raju Hormis, New York, NY (US); Junyi Li, Chester, NJ (US); Navid Abedini, Somerset, NJ (US); Juergen Cezanne, Ocean Township, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/875,896

(22) Filed: May 15, 2020

(65) Prior Publication Data

US 2020/0382200 A1 Dec. 3, 2020

Related U.S. Application Data

(60) Provisional application No. 62/854,916, filed on May 30, 2019.

(51) Int. Cl.
| | |
|---|---|
| *H04B 7/155* | (2006.01) |
| *H04B 3/36* | (2006.01) |
| *H04W 16/26* | (2009.01) |
| *H04W 72/04* | (2009.01) |
| *H04L 27/10* | (2006.01) |

(52) U.S. Cl.
CPC ........ *H04B 7/15528* (2013.01); *H04W 16/26* (2013.01); *H04W 72/0433* (2013.01)

(58) Field of Classification Search
CPC ............ H04B 7/15528; H04B 7/15542; H04B 7/15592; H04B 7/026; H04B 7/15; H04B 7/14; H04B 1/26; H04B 1/302; H04B 10/64; H04W 16/26; H04W 72/0433
See application file for complete search history.

(56) References Cited

U.S. PATENT DOCUMENTS

| | | | |
|---|---|---|---|
| 6,404,775 B1 * | 6/2002 | Leslie | H04B 7/15528 370/315 |
| 6,615,021 B1 | 9/2003 | Lovinggood et al. | |

(Continued)

OTHER PUBLICATIONS

International Search Report and Written Opinion—PCT/US2020/033431—ISA/EPO—dated Aug. 10, 2020.

*Primary Examiner* — Tuan A Tran
(74) *Attorney, Agent, or Firm* — Procopio, Cory, Hargreaves & Savitch LLP

(57) ABSTRACT

The present disclosure relates to methods and apparatus for wireless communication of a phased array repeater. The apparatus may receive, from a base station, a signal for a user equipment (UE) at a first frequency. The apparatus may also adjust, at the phased array repeater, the first frequency of the signal to a second frequency, where the first frequency may be adjusted by heterodyning. Additionally, the apparatus may transmit the signal to the UE at the second frequency. The present disclosure also relates to methods and apparatus for wireless communication. The apparatus may transmit a signal for a UE at a first frequency. Further, the apparatus may determine control information for tuning a frequency adjustment of the signal at a repeater. The apparatus may also transmit, to the repeater, the control information for tuning the frequency adjustment.

33 Claims, 18 Drawing Sheets

(56) References Cited

U.S. PATENT DOCUMENTS

| | | | |
|---|---|---|---|
| 6,750,789 B2 | 6/2004 | Herre et al. | |
| 7,200,134 B2 | 4/2007 | Proctor, Jr. et al. | |
| 7,480,486 B1 * | 1/2009 | Oh | H04B 7/1555 370/315 |
| 7,711,336 B2 * | 5/2010 | Kim | H03D 7/161 455/203 |
| 7,813,451 B2 * | 10/2010 | Binder | H04B 7/15528 375/316 |
| 8,090,314 B2 * | 1/2012 | Rofougaran | H04B 7/155 455/22 |
| 8,095,067 B2 | 1/2012 | Gainey et al. | |
| 8,116,239 B2 * | 2/2012 | Proctor, Jr. | H04B 7/15571 370/279 |
| 8,446,936 B2 * | 5/2013 | Kim | H04B 7/15585 375/220 |
| 8,489,019 B2 | 7/2013 | Rofougaran | |
| 8,554,815 B1 * | 10/2013 | Do | E02F 3/3609 708/271 |
| 9,002,260 B2 | 4/2015 | Martin | |
| 9,178,602 B2 * | 11/2015 | Yoon | H04B 7/15507 |
| 9,973,257 B1 | 5/2018 | Sung | |
| 2007/0202893 A1 | 8/2007 | Payne et al. | |
| 2009/0316829 A1 * | 12/2009 | Rofougaran | H04B 7/08 375/299 |
| 2010/0052797 A1 * | 3/2010 | Carley | H03L 7/0814 331/18 |
| 2010/0240302 A1 * | 9/2010 | Buczkiewicz | H04B 1/034 455/11.1 |
| 2010/0265996 A1 * | 10/2010 | Lim | H04B 7/15528 375/211 |
| 2010/0284446 A1 * | 11/2010 | Mu | H04B 7/15521 375/211 |
| 2011/0275313 A1 * | 11/2011 | Baldemair | H04B 7/2606 455/17 |
| 2013/0028169 A1 | 1/2013 | Bontu et al. | |
| 2013/0083828 A1 * | 4/2013 | Rofougaran | H04B 7/15542 375/211 |
| 2016/0100347 A1 * | 4/2016 | Ryu | H04W 76/16 455/445 |
| 2017/0265187 A1 * | 9/2017 | Chen | H04B 7/2606 |
| 2018/0034677 A1 * | 2/2018 | Limberg | H04L 27/38 |

\* cited by examiner

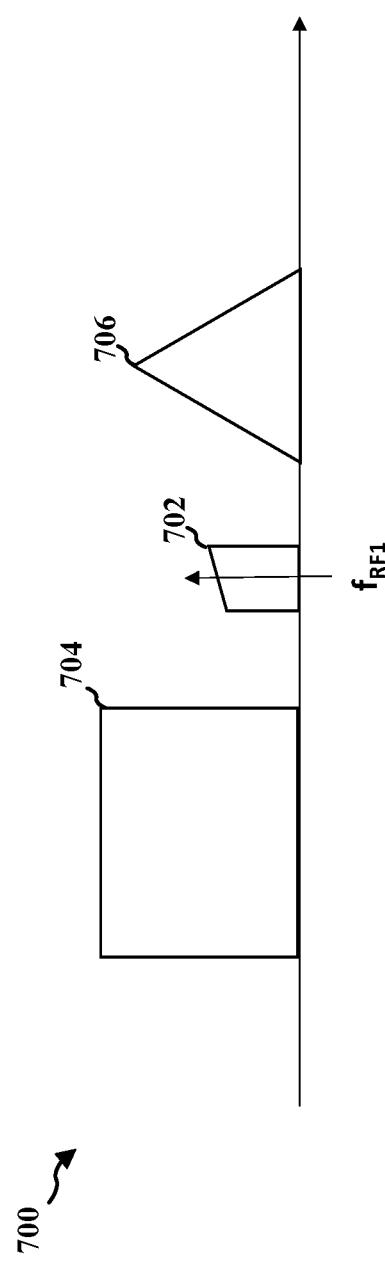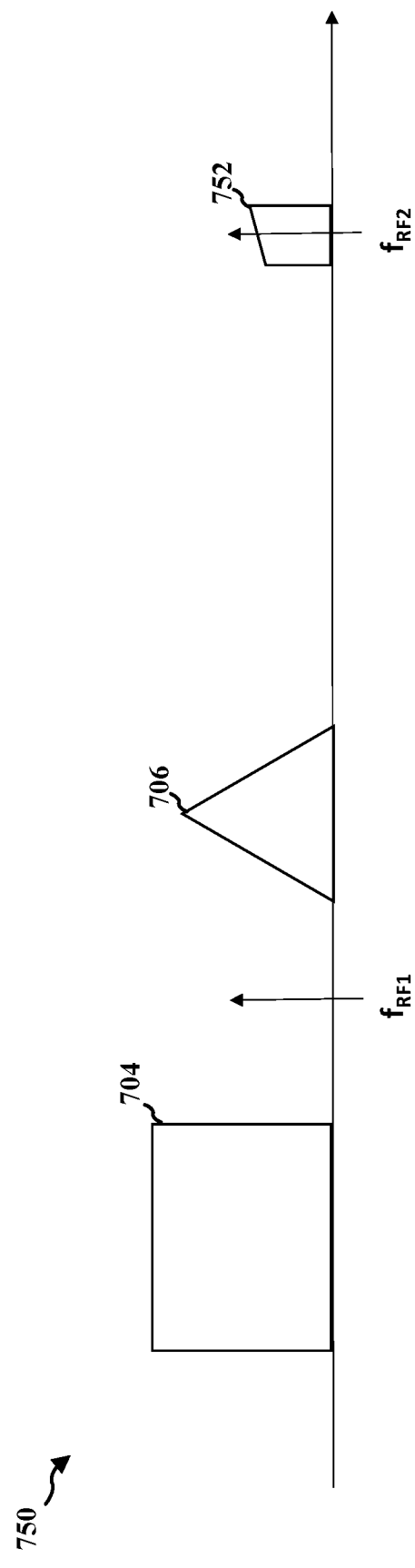

METHODS AND APPARATUS FOR FREQUENCY TRANSLATING REPEATERS

CROSS REFERENCE TO RELATED APPLICATION(S)

This application claims the benefit of U.S. Provisional Application Ser. No. 62/854,916, entitled "METHODS AND APPARATUS FOR FREQUENCY TRANSLATING REPEATERS" and filed on May 30, 2019, which is expressly incorporated by reference herein in its entirety.

BACKGROUND

Technical Field

The present disclosure relates generally to communication systems, and more particularly, to methods and devices for transmitting and/or receiving communications including a repeater.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication of a phased array repeater. The apparatus may receive, from a base station, a signal for a user equipment (UE) at a first frequency. The apparatus may also adjust, at the phased array repeater, the first frequency of the signal to a second frequency, where the first frequency may be adjusted by heterodyning. Additionally, the apparatus may transmit the signal to the UE at the second frequency.

In an aspect of the disclosure, a method, a computer-readable medium, and an apparatus are provided for wireless communication. The apparatus may transmit a signal for a UE at a first frequency. Further, the apparatus may determine control information for tuning a frequency adjustment of the signal at a repeater. The apparatus may also transmit, to the repeater, the control information for tuning the frequency adjustment.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 7A-7B are diagrams illustrating transmissions at an example repeater in accordance with aspects of the present disclosure.

DETAILED DESCRIPTION

Figure 1:
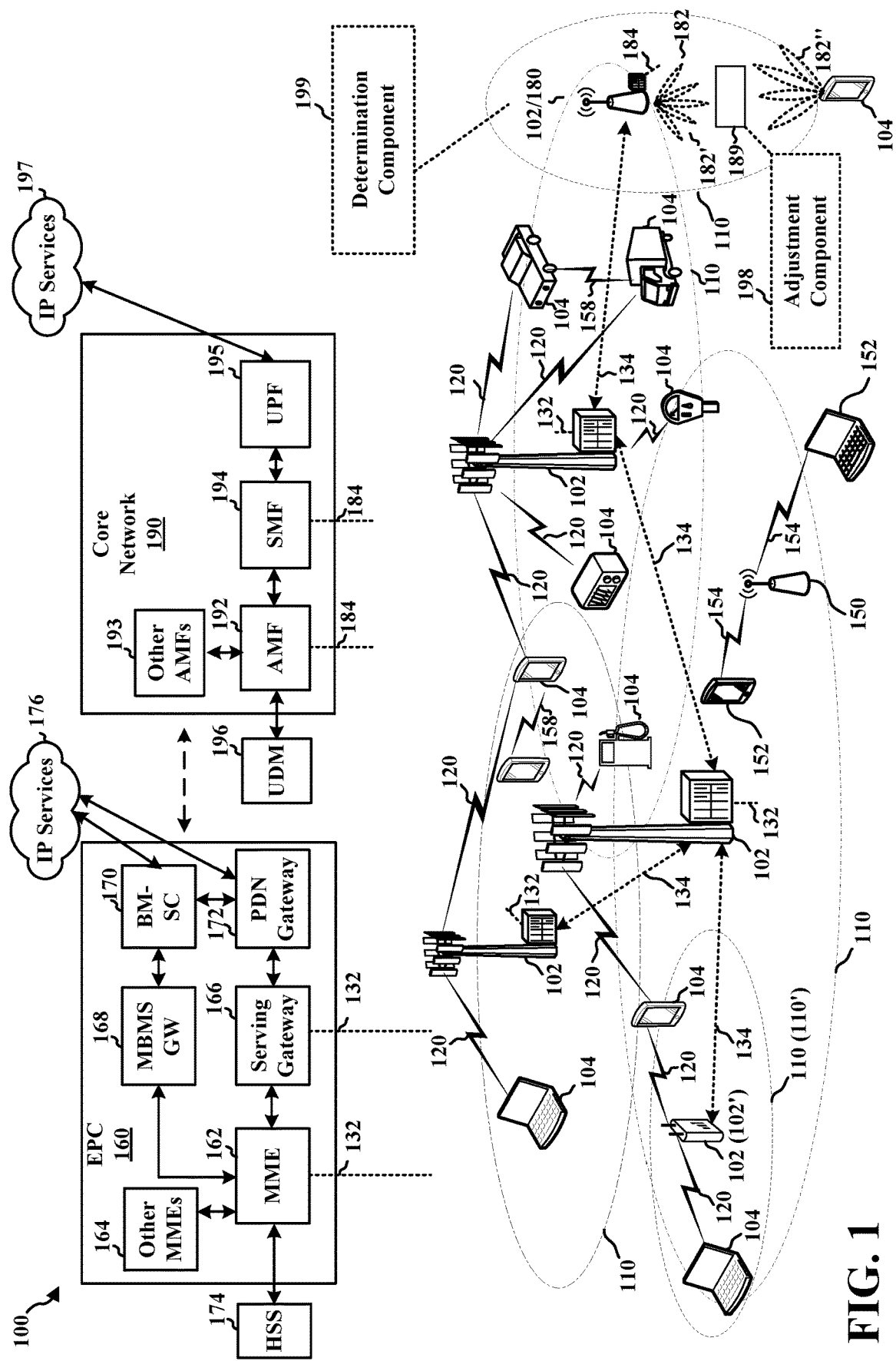
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, repeater 189 may include an adjustment component 198 configured to receive, from a base station, a signal or communication for a user equipment (UE) at a first frequency. The adjustment component 198 may also be configured to adjust the first frequency of the signal or communication to a second frequency, wherein the first frequency is adjusted by heterodyning. The adjustment component 198 may also be configured to transmit the signal or communication to the UE at the second frequency. Additionally, the base station 102/180 may include a determination component 199 configured to transmit a signal or communication for a UE at a first frequency. The determination component 199 may also be configured to determine control information for tuning a frequency adjustment of the signal or communication at a repeater. The determination component 199 may also be configured to transmit, to the repeater, the control information for tuning the frequency adjustment. Although the following description may be focused NB-IoT/MTC, the concepts described herein may be applicable to other similar areas, such as 5G NR, LTE, LTE-A, CDMA, GSM, and other wireless technologies.

Figure 2:
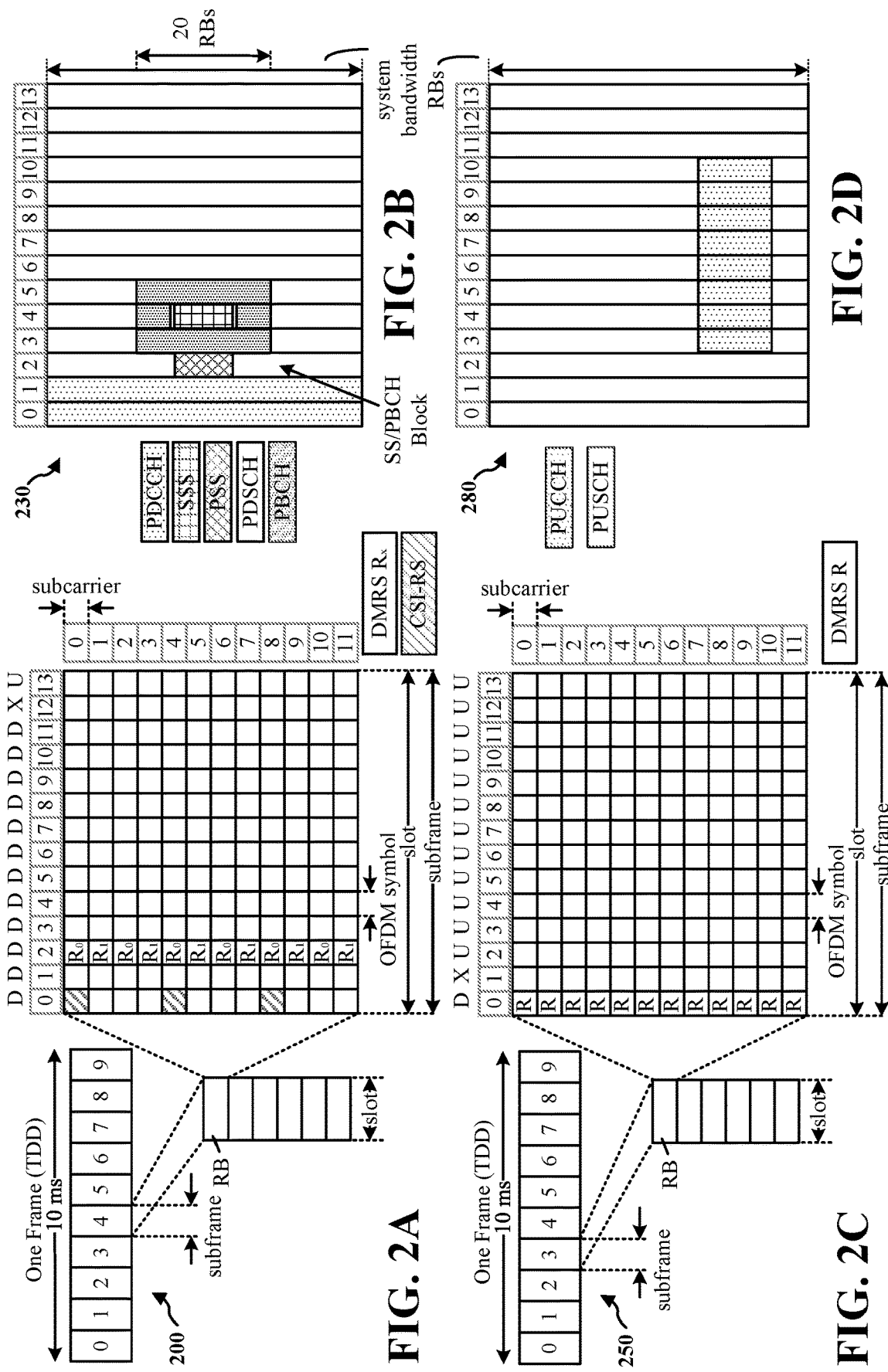
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
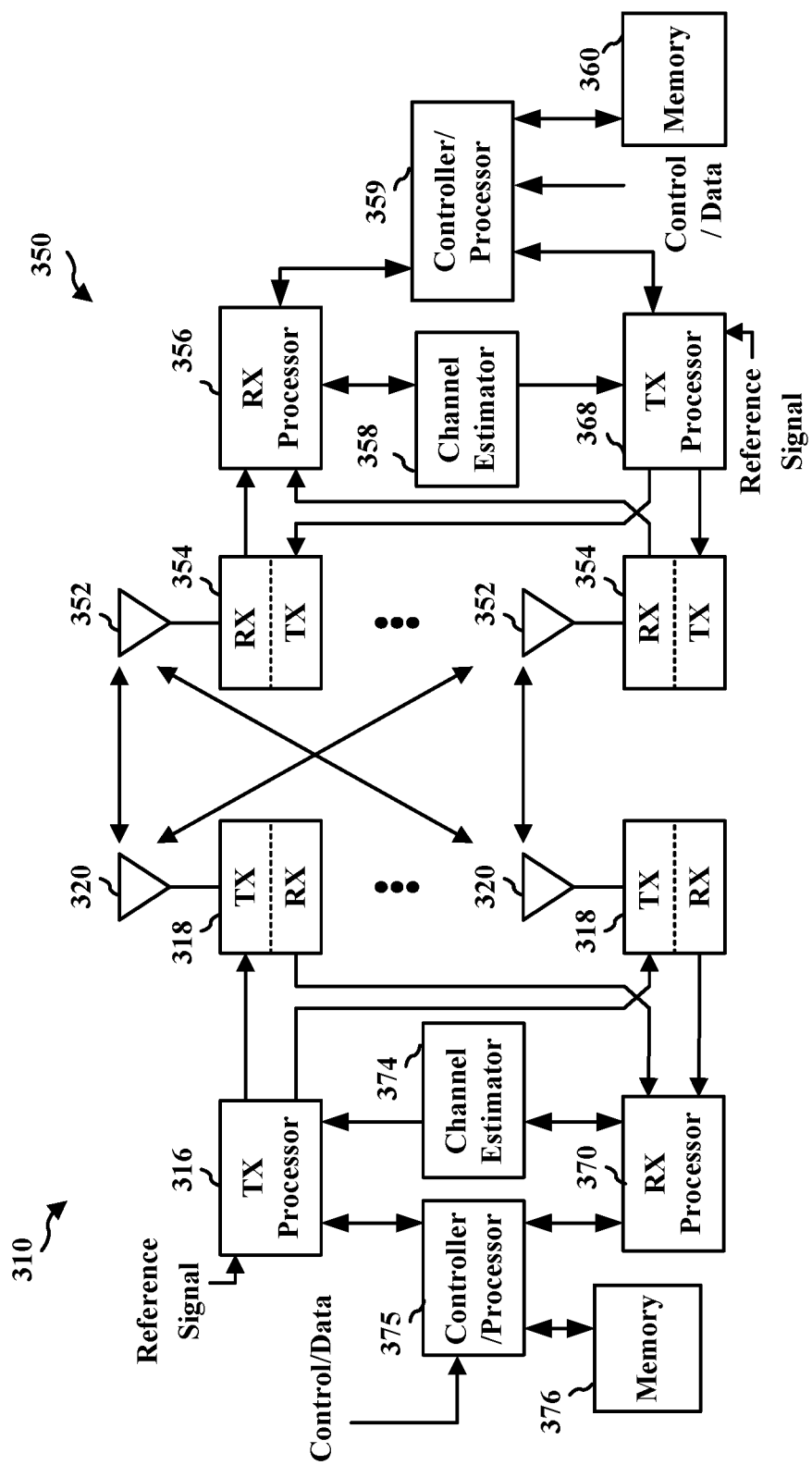
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Wireless communications systems can experience loss or reduction of signal quality based on a number of different factors. In line-of-site (LOS) communication scenarios communications or transmissions, e.g., mmW transmissions, may be limited or reduced based on path-loss as the signal travels through air between a transmitter and a receiver. This path-loss may be addressed using beamforming techniques. In some aspects, path-loss due to distance between a transmitter and a receiver may not be a primary constraint. In non-line-of-sight (NLOS) communication scenarios, e.g., an outdoor urban area with many buildings or indoors, transmissions can be limited by physical objects that block a signal or that attenuate the signal. In both LOS and NLOS scenarios, the quality of transmissions received by a receiver can also be limited by signal jammers, which can interfere with the signal. Signal jammers can block a frequency spectrum or interfere with the signal, rather than physically blocking the signal. Accordingly, signal jammers can block or limit a UE and base station from using a certain frequency spectrum when communicating with one another. There are a number of different types of signal jammers, e.g., adjacent channel jammers, in-band jammers, or out-of-band jammers.

As indicated above, at mmW frequencies, UEs may not have good coverage when their signals are jammed or physically blocked by certain objects, e.g., buildings, towers, or a user's body. As such, it can be useful to copy or repeat a signal in order to improve the reception at the UE by bypassing or avoiding signal jammers or blocking objects. For instance, a repeater or hub, i.e., a device that can copy or repeat a signal from a base station to a UE, can be a useful way to address the aforementioned signal jamming or blocking. In some instances, a repeater or phased array repeater can form a secondary path between a base station and a UE. For example, in the event that a signal from a base station or a UE is jammed or blocked, e.g., by a truck or building, a repeater may assist communication between the base station and UE to enable the signal to be transmitted to the UE without being block or jammed.

In order to allow signals to be freely transmitted between a base station and a UE, repeaters or phased array repeaters can adjust or shift a signal to a different frequency. For example, some repeaters can adjust a frequency of a signal received from a base station to a different frequency for transmission from the repeater to the UE. The frequency adjustment may be based on heterodyning. This frequency band adjustment can be accomplished with a single mixing or heterodyning stage or multiple heterodyning stages. In some aspects, the signal may be both heterodyned and filtered. The signal may be filtered more than once. For instance, aspects of the present disclosure may heterodyne and filter the signal at approximately the same frequency. In some instances, communications at different frequencies may require separate repeaters. For example, mmW communication and intermediate frequency (IF) communication operate at different frequencies, e.g., 28 GHz compared to 5 GHz, so these communications may require different repeaters.

As indicated above, aspects of the present disclosure may involve translating the frequency of signals at a repeater or phased array repeater in order to shift the frequency of the signal away from the frequency of signal jammers. Frequency translation can be tunable or adjustable, e.g., to handle signal jammers in different scenarios. For example, the frequency adjustment applied by the repeater can be tuned or adjusted via a local oscillator (LO) frequency. In some aspects, a base station can inform a repeater about an amount of frequency adjustment to be applied by the repeater. In some aspects, a repeater or phased array repeater can include the ability to adjust or tune a frequency, but the base station can inform the repeater of the adjusted frequency and/or program the frequency adjustment.

In some instances, this frequency translation can ease the filtering requirements at a UE. Therefore, the step of translating or adjusting a signal away from a signal jammer may simplify the filtering process. Moreover, achieving isolation between the transmit (TX) signals and receive (RX) signals can be improve the ability to filter the signals. In some aspects, signal filtering can allow for a higher forward gain. As described above, repeaters or relays herein can provide a secondary lower-loss and un-jammed signal path between a base station and a UE.

In some aspects, radiation from the TX signal may interfere or leak into the path of the RX signal and cause instability. For example, a signal transmitted by transmitting antennas of a repeater may be received by receiving antennas of the repeater. This interference or leakage can also cause other issues, such as repeater instability or spectral re-growth, e.g., based on the formula $f_{RF1} \pm k\, f_{LO}$, where $f_{RF1}$ is the incoming signal, $f_{LO}$ is the frequency translation amount, and k is a constant (e.g., 2, 3, 4, etc.). Signal filtering may reduce both repeater instability and spectral re-growth. For example, signal filtering may be applied along with adjustment or heterodyning. Signal filtering may also ease the impact of signal jammers at the repeater. In some aspects, the complexity of signal filtering, e.g., Q-factor, area, power, may depend on the degree of frequency separation. Thus, the frequency adjustment or heterodyning may reduce the complexity of signal filtering. Additionally, beamforming or spatial filtering may be used to further improve the isolation between the TX and receive RX signal, as well as reduce signal leakage.

In some instances, repeaters may not introduce much intersymbol interference (ISI), as the feedback path may be attenuated by filtering. Repeaters or phased array repeaters can help to control the direction of a signal, the amount of signal gain, and the amount of frequency translation or LO frequency amount.

Repeaters or phased array repeaters can also be controlled by a base station through a second link. The first link with the base station, through which the repeater receives the communication intended for the UE, may be based on a first RAT. The second link, through which the repeater receives control for operation of the repeater, may be based on a second RAT. For example, the first link may be based on mmW based communication, such as 5G NR. The second, control link may be based on any of NB-IoT, Bluetooth, WiFi, etc. For example, the repeater may receive control communication from the base station via the second link for any of direction information, gain, LE frequency (e.g., an indication of an amount of frequency translation to apply when transmitting communication received from the base station to the UE), etc. The repeater may receive the direction, gain, and/or LO information and may apply the control information in receiving communication from the base station and/or transmitting the communication to the UE.

In some aspects, filtering requirements can be relaxed depending on requirements. Additionally, phase-shifters and/or mixers can be combined in some examples, e.g., as LO phase-shifters. These phase-shifters can shift the LO signal with the same effect as mentioned above.

Figure 4:
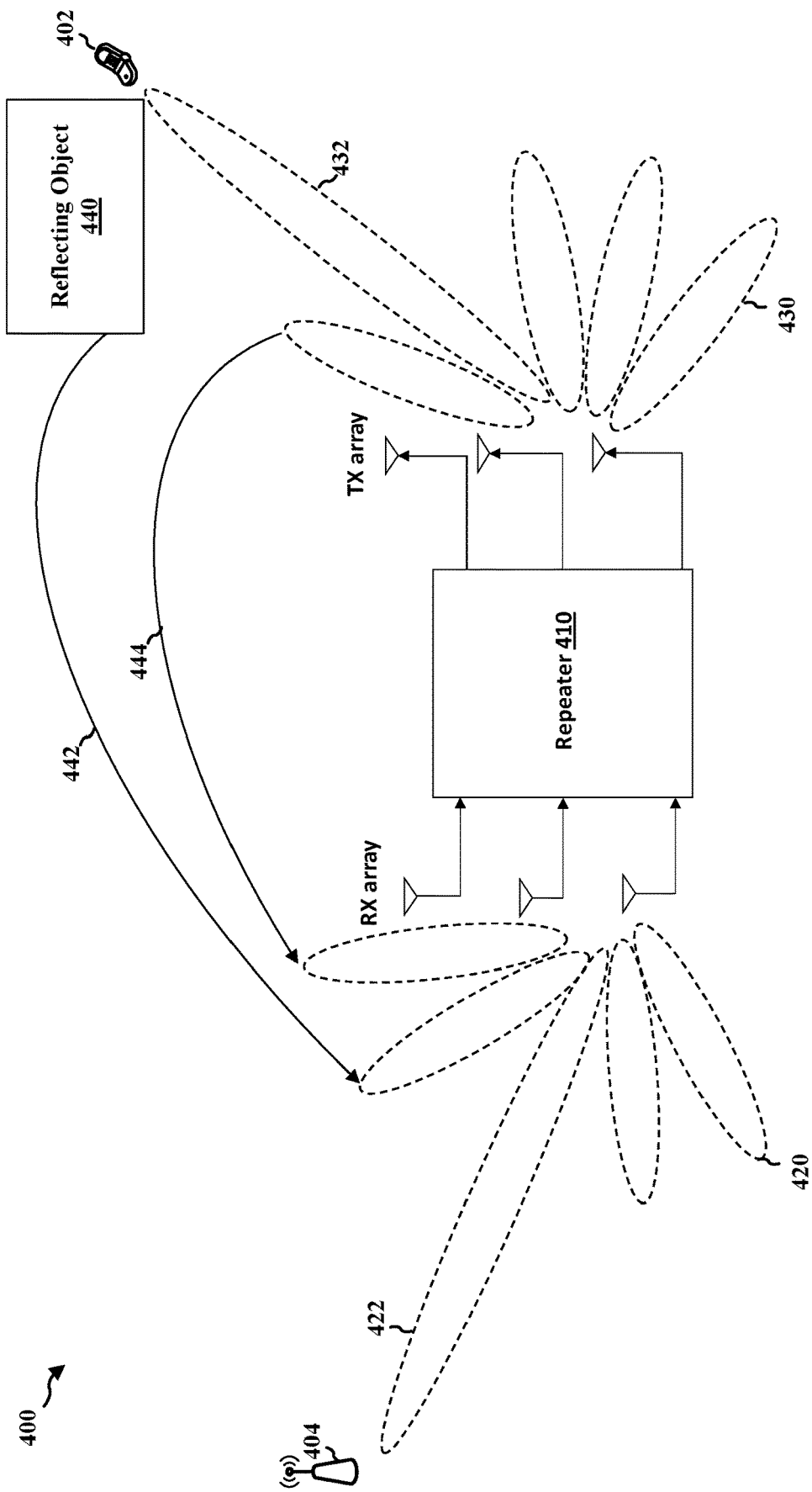
FIG. 4 is a diagram illustrating transmissions including an example repeater in accordance with aspects of the present disclosure.

FIG. 4 is a diagram 400 illustrating transmissions including an example repeater. As shown in FIG. 4, repeater 410 may include a RX array of antennas for receiving communication from a base station 404 and a TX array of antennas for transmitting the communication received from the base station 404 to a UE 402. The RX array may receive communication from the base station 404 using RX signal lobes 420, including target RX signal 422. Similarly, the TX array may transmit communication to the UE 402 using TX signal lobes 430, including amplified target RX signal 432. The diagram also illustrates reflecting object 440, signal reflection 442, and lobe coupling 444. FIG. 4 displays that reflecting object 440 can reflect the signal from main TX lobe, e.g., amplified target RX signal 432, toward the RX signal path. Further, lobe coupling 444 can mutually couple the side lobes, e.g., RX signal lobes 420 and TX signal lobes 430. For example, if the reflected transmission frequency is the same as the frequency of the signal received from the base station, the Rx array may treat the reflected transmission as part of the signal received from the base station. Although the repeater 410 is shown repeating signals between a base station 404 and a UE 402, the repeater 410 may repeat any wireless signals between any two wireless devices, such as between two base stations, two UEs, and/or from a UE to a base station. Similar principle as apply to other examples disclosed herein.

As displayed in FIG. 4, the RX and TX side beamforming may include a main beam, e.g., target RX signal 422 and amplified target RX signal 432, and side lobes, e.g., lobes 420 and 430. One issue with repeaters can be that the side lobes couple or experience mutual coupling, e.g., lobe coupling 444. The positive feedback with the signals or lobes can make the signal loop unstable. As mentioned above, aspects of the present disclosure include moving or adjusting the signal by shifting a frequency, and may also include filtering. Accordingly, aspects of the present disclosure can reduce coupling of the side lobes of the RX and TX arrays and feedback of the signal, and maintain the desired RX and TX signal, e.g., target RX signal 422 and amplified target RX signal 432.

Figure 5:
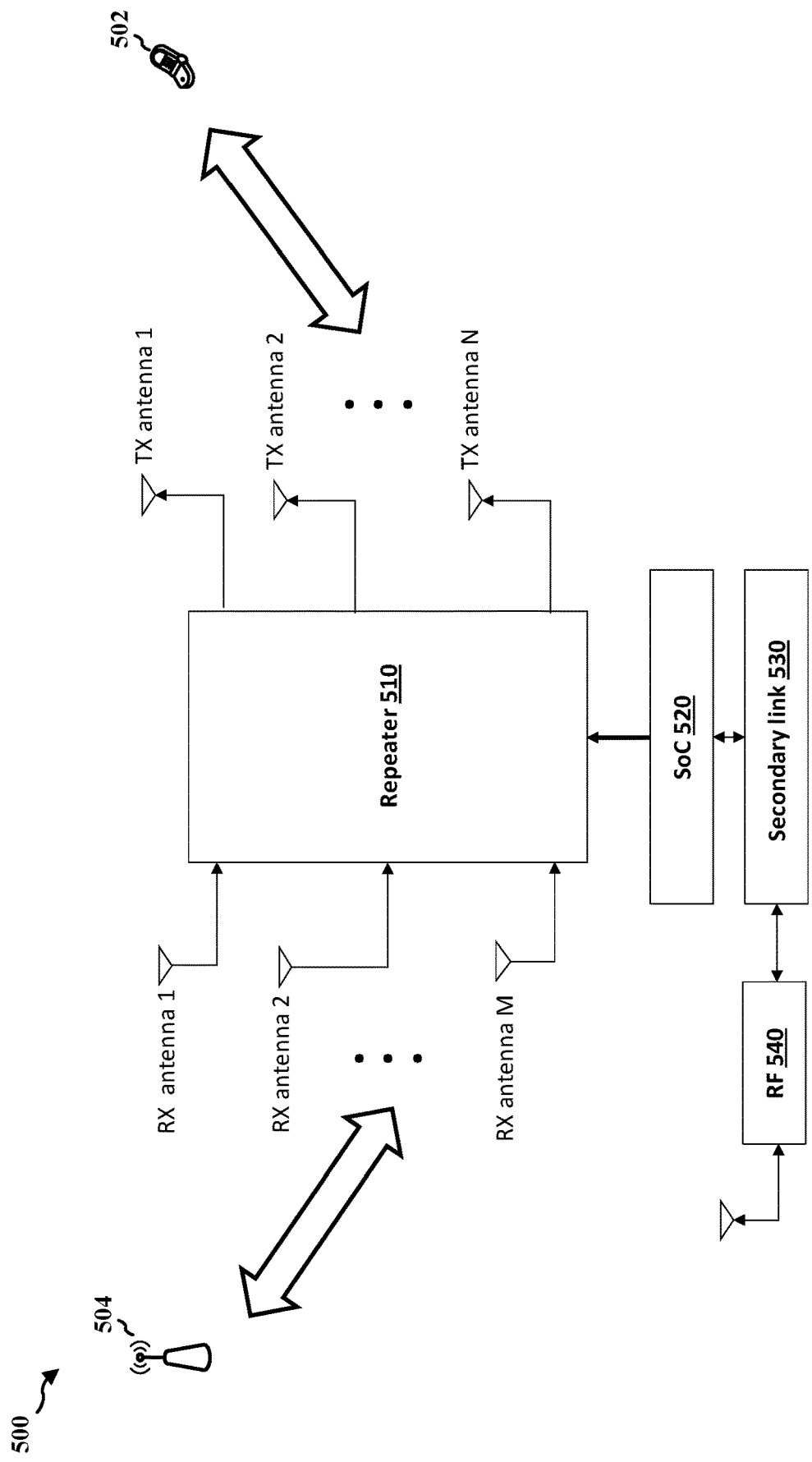
FIG. 5 is a diagram illustrating transmissions including an example repeater in accordance with aspects of the present disclosure.

FIG. 5 is a diagram 500 illustrating aspects of an example repeater. As shown in FIG. 5, diagram 500 includes UE 502, base station 504, and repeater or phased array repeater 510. The repeater is illustrated as including a set of RX antennas (e.g., RX antenna 1 to RX antenna M) and a set of TX antennas (e.g., TX antenna 1 to TX antenna N), SoC component 520, secondary link component 530, and RF component 540. FIG. 5 displays that repeater 510 takes a signal that is received from the base station 504 with a phase array antennae, e.g., the RX antennae. Repeater 510 then processes the signal and re-transmits the signal, e.g., to the UE 502, on the transmit side, e.g., with the TX antennae. Thus, the repeater copies or repeats the signal received from the base station.

As mentioned above, repeater 510 can filter the signal, adjust or heterodyne the signal, and/or generate a LO frequency, e.g., to assist with the signal filtering or adjustment. As shown in FIG. 5, repeater 510 can comprise a SoC component 520, a secondary link component 530, and RF component 540. The RF component 540 may operate at a number of different frequencies, such as a mmW frequency or a non-mmW frequency. In some aspects, the RF component 540 may operate at a non-mmW frequency, e.g., a sub-6 GHz frequency, while other antennas may operate at a mmW frequency. The secondary link component 530 can be based on NB-IoT. Accordingly, the secondary link component 530 may be referred to as an NB-IoT component. In some aspects, secondary link component 530 may be based on another type of communication other than NB-IoT, e.g., Bluetooth or Wi-Fi. The secondary link component 530 may be based on a different RAT than the communication received by the base station via the set of RX antennas. This secondary link component 530 may provide another level of control for the repeater. For example, secondary link component 530 can provide base station 504 with control information, e.g., any of the amount of gain to set at the repeater, the direction of the signal beam for reception and/or transmission, and/or an amount of frequency adjustment to apply for communication repeated to the UE 502. Accordingly, this secondary link can provide a level of control to the base station 504, e.g., at a different frequency.

Aspects of the present disclosure can generate a variable LO frequency, e.g., $f_{LO}$, to assist with frequency adjustment or translation. In some aspects, this variable LO frequency can be generated with a tunable frequency synthesizer. For example, programmable dividers, e.g., parameters n and m, can be used to generate rational ratios of a reference clock. Additionally, certain types of modulation, e.g., dithering circuit and/or sigma-delta modulation, can be used for irrational ratios. Each of these programmable elements can be adjustable or tunable by the base station, e.g., via a secondary channel. As mentioned above, these programmable elements can help to avoid signal jammers, which can have variable bandwidth and center frequencies.

In some aspects, the variable LO frequency may have a number of constraints. For example, the variable LO frequency may be constrained such that the RX signal can fall in the pass band of RX filter and/or the TX signal can fall in the pass band of TX filter. Additionally, the carrier drift of the variable LO frequency may not be significant, as the UE may acquire the frequency and timing lock. For example, the secondary or NB-IoT link can be used to lock the variable LO frequency to the base station.

Figure 6A:
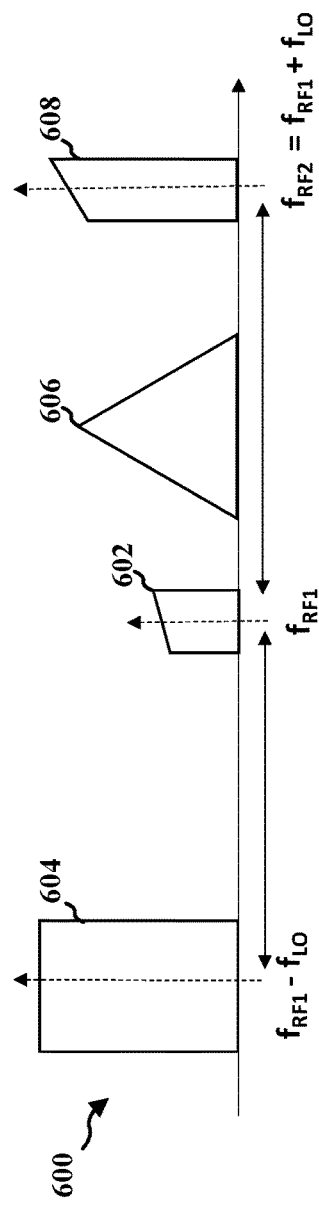
FIGS. 6A-6D are diagrams illustrating transmissions at an example repeater in accordance with aspects of the present disclosure.

FIGS. 6A-6D are diagrams 600, 610, 620, and 630, respectively, illustrating communications or transmissions at an example repeater or phased array repeater. FIGS. 6A-6D show the process of receiving a signal, filtering a signal, translating or heterodyning a signal, and transmitting the frequency adjusted signal at a repeater. FIG. 6A displays a RX signal 602 that is received at the repeater from a base station, an external image or signal blocker 604, a signal jammer 606, and TX signal leakage 608. RX signal 602 corresponds to the desired signal at frequency $f_{RF1}$. A signal blocker 604 may block the signal at frequency $f_{RF1}-f_{LO}$, and a signal jammer 606 may cause interference, and/or TX signal leakage 608 may lead to a signal at frequency $f_{RF2}=f_{RF1}+f_{LO}$. Even if signal blocker 604, signal jammer 606, and/or TX signal leakage 608 do not overlap in frequency with the desired signal from the base station at $f_{RF1}$, they may each constrain or interfere with RX signal 602. The location of these sources of interference are merely used to illustrate the concept. The signal blocker 604, signal jammer 606, and/or TX signal leakage 608 may be located at any frequency relative to the desired signal from the base station.

As an example, the power of the blocker 604 or jammer 606 or blocker cause interference with the RX signal 602. In some aspects, this interference can cause the RX signal 602 at frequency $f_{RF1}$ to overcompensate for the blocker 604 or jammer 606, e.g., by applying gain compression. Aspects described in connection with FIGS. 6A-6D may help to ensure that the UE that receives the RX signal 602 by reducing interference caused by the signal blocker 604, signal jammer 606, and TX signal leakage 608.

Figure 6B:
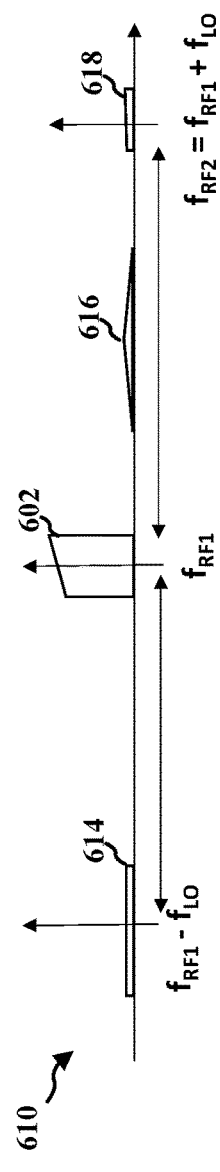

FIG. 6B displays the communications after applying a pre-selected RX filter that filters the signal jammers or blockers in FIG. 6A from the signal received from the base station. Diagram 610 displays RX signal 602, suppressed external image or signal blocker 614 (e.g., based on 604), suppressed signal jammer 616 (e.g., based on 606), and suppressed TX signal leakage 618 (e.g., based on 608). As shown in FIG. 6B, RX signal blocker 604, signal jammer 606, and TX signal leakage 608 have each been filtered or suppressed with a RX filter to result in suppressed signal blocker 614, suppressed signal jammer 616, and suppressed TX signal leakage 618. Suppressed signal blocker 614 is at frequency $f_{RF1}-f_{LO}$, and suppressed TX signal leakage 618 is at frequency $f_{RF2}=f_{RF1}+f_{LO}$. In some aspects, the repeater may filter the signal blocker or jammer, but this may also be accomplished with a filter. For instance, a filter can help to reduce the interference or signal blockers or jammers. Accordingly, repeaters herein may perform a filtering step as shown in FIG. 6B.

Figure 6C:
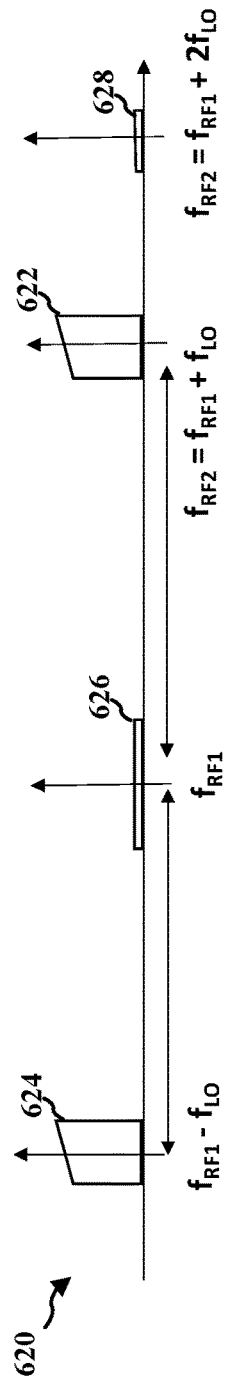

FIG. 6C displays the communications after adjusting or heterodyning the filtered signal from the base station, e.g., as performed in FIG. 6B. FIG. 6C illustrates the process of frequency translation of the signal from the base station by heterodyning. Diagram 620 displays adjusted RX signal 622, generated side-band 624, suppressed blocker plus leakage 626 (e.g., based on 614), and adjusted suppressed TX signal leakage 628 (e.g., based on 618). As shown in FIG. 6C, RX signal 602, suppressed signal blocker 614, and suppressed TX signal leakage 618 have each been adjusted or heterodyned to result in adjusted RX signal 622, generated side-band 624, suppressed blocker plus leakage 626, and adjusted suppressed TX signal leakage 628. Based on heterodyning, adjusted RX signal 622 may be adjusted to frequency $f_{RF2}=f_{RF1}+f_{LO}$ and/or $f_{RF2}=f_{RF1}-f_{LO}$. The suppressed blocker plus leakage 626 may be adjusted to frequency $f_{RF1}$, and adjusted suppressed TX signal leakage 628 may be adjusted to frequency $f_{RF2}=f_{RF1}+2f_{LO}$.

FIG. 6C displays that the repeater or phased array repeater described herein can be to adjust or translate the frequency, such as through heterodyning. In some aspects, heterodyning a signal can be to mix it with a local oscillator (LO) which produces two copies e.g., a pair of sidebands (SSBs), of the signal. Once heterodyning is performed, there can be filtering to determine which of the two SSBs may be selected. As such, repeaters according to the present disclosure can adjust or move signals to other frequencies. As shown in FIG. 6C, $f_{LO}$ can be the frequency translation amount, e.g., that is synthesized locally at the repeater.

Figure 6D:
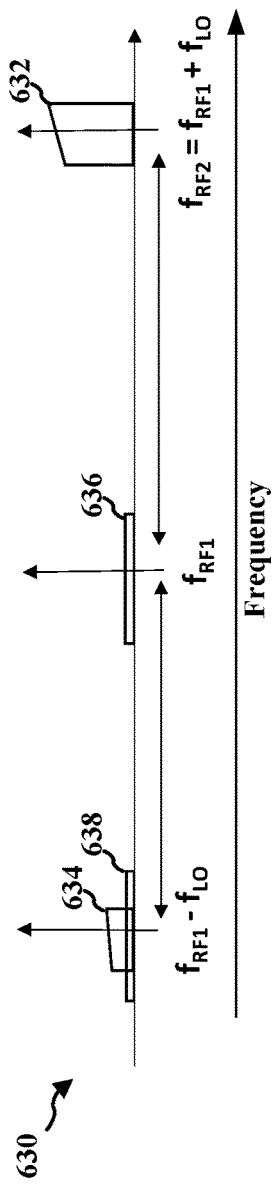

FIG. 6D displays the communications after transmit filtering the adjusted or heterodyned signals in FIG. 6C. Diagram 630 displays filtered RX signal 632, generated side-band 634, filtered blocker plus leakage 636, and filtered TX signal leakage 638. As shown in FIG. 6D, adjusted RX signal 622, suppressed blocker plus leakage 626, and adjusted suppressed TX signal leakage 628 have each been filtered to result in filtered RX signal 632, filtered blocker plus leakage 636, and filtered TX signal leakage 638. As shown in FIG. 6D, filtered RX signal 632 may be frequency adjusted to a pair of frequencies, e.g., at frequency $f_{RF2}=f_{RF1}+f_{LO}$, and $f_{RF2}=f_{RF1}-f_{LO}$. FIG. 6D shows that the repeater or phased array repeater can apply a second filter, e.g., a transmission filter, which can help to determine which heterodyned signal 622, 624 to select. As such, after shifting or heterodyning the frequency, the transmit frequency can be different from the receive frequency.

The repeater can receive signal adjustment information from the base station, e.g., an indication of the LO to apply when frequency adjusting the received signal. The repeater can then adjust and/or translate the frequency of the signal, such as through heterodyning and/or filtering. Accordingly, the TX frequency of the communication transmitted to the UE may be different from the RX frequency at which the communication for the UE is received from the base station. FIGS. 6A-6D display that aspects of the present disclosure can apply a RX filter to filter signal blockers or jammers. In one example, the RX filter may be preselected, e.g., based on the frequency of the communication received from the base station. Aspects of the present disclosure may then include performing a frequency adjustment or translation by heterodyning, e.g., by using a LO frequency. In some aspects, this frequency adjustment or translation applied by the repeater can be controlled by the base station. Accordingly, the base station may determine the amount of frequency adjustment or translation, such as by determining the $f_{LO}$. Thus, the frequency adjustment may be referred to as a tunable frequency adjustment and may be tuned by the base station. As shown in FIGS. 6A-6D, aspects of the present disclosure may include a low-side LO injection, such that $f_{LO}$ may be lower than $f_{RF1}$. The present disclosure may also perform a high-side LO injection, such that $f_{LO}$ may be higher than $f_{RF1}$. Aspects of the present disclosure may then utilize transmit filtering to determine which heterodyned signal to select. As mentioned above, the process of heterodyning may result in a pair of SSBs, so the desired sideband may be selected after heterodyning.

FIGS. 7A-7B are diagrams 700 and 750, respectively, illustrating communications or transmissions at an example UE. FIG. 7A displays a RX signal 702, an external image or signal blocker 704, a signal jammer 706. For example, RX signal 702 is a received signal at a UE, which is at frequency $f_{RF1}$. As shown in FIG. 7A, the RX signal 702 may be close in frequency to blocker 704 or jammer 706. In some aspects, a repeater may not be near a jammer, e.g., as a repeater can be placed where the signals may not be interfered with. However, a UE may be near a blocker or jammer. Accordingly, the blockers or jammers around a UE may be different than the blockers or jammers around a repeater. As such, aspects of the present disclosure can utilize frequency translation to account for the blockers or jammers near a UE or a repeater.

FIG. 7B displays signal blocker 704, signal jammer 706, and adjusted RX signal 752, e.g., as observed by the UE. Adjusted RX signal 752 is at frequency $f_{RF2}$. As shown in FIG. 7B, the repeater has adjusted or translated the signal 702 away from blocker 704 and jammer 706, e.g., by heterodyning and filtering, which results in signal 752. In some aspects, signal 752 in FIG. 7B can be easier to demodulate at the UE compared to signal 702 in FIG. 7A, e.g., due to the increased distance (in frequency) to the jammer 706 and blocker 704.

Figure 8:
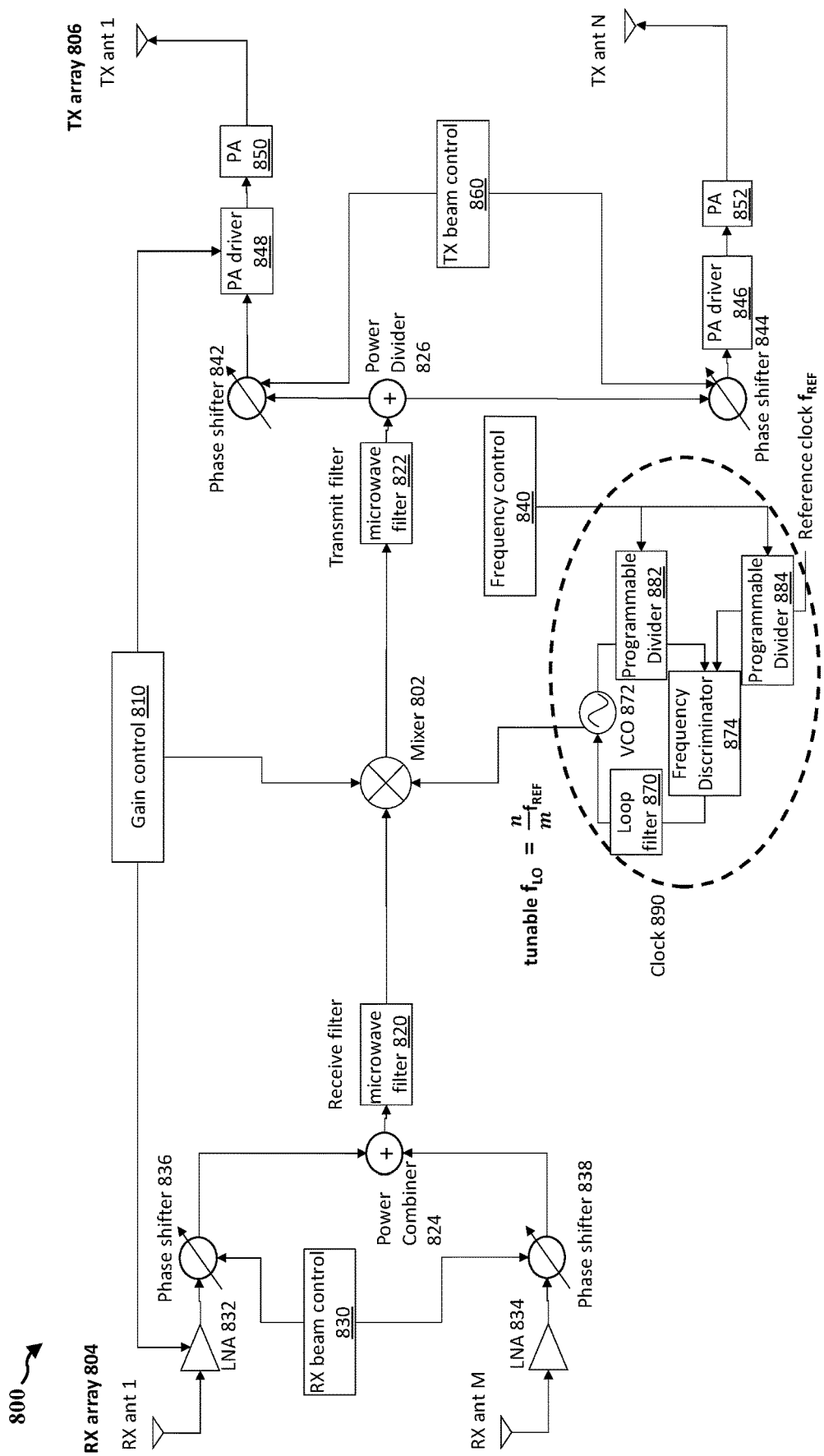
FIG. 8 illustrates an example repeater in accordance with aspects of the present disclosure.

FIG. 8 illustrates an example repeater or phased array repeater 800 in accordance with aspects of the present disclosure. As shown in FIG. 8, repeater 800 includes a RX array 804 including RX antenna 1 through RX antenna M, as well as TX array 806 including TX antenna 1 through TX antenna N. As shown in FIG. 8, repeater 800 also includes mixer 802, gain control 810, receive filter or microwave filter 820, and transmit filter or microwave filter 822. Mixer 802 can also be referred to as a heterodyner. Repeater 800 also includes power combiner 824, power divider 826, RX beam control unit 830, low noise amplifiers (LNA) 832, LNA 834, phase shifter 836, phase shifter 838, frequency control unit 840, phase shifter 842, phase shifter 844, power amplifier (PA) 846, PA driver 848, PA 850, PA 852, and TX beam control unit 860.

Additionally, repeater 800 includes loop filter 870, voltage controlled oscillator (VCO) 872, frequency discriminator 874, programmable divider 882, programmable divider 884, and clock 890. As shown in FIG. 8, reference clock $f_{REF}$ is connected to the programmable divider 884. Programmable divider 882 can divide by a parameter n and programmable divider 884 can divide by a parameter m. Additionally, repeater 800 can include a tunable $f_{LO}$ that is based on (n/m) multiplied by $f_{REF}$.

FIG. 8 displays that there is a single set of mixers or heterodyners, e.g., mixer 802, which can also be referred to as a multiplier Accordingly, the example shown in FIG. 8 can have a single heterodyner. The example shown in FIG. 9 can also have a single heterodyner. Other examples, e.g., the example shown in FIG. 10, can have multiple heterodyners. As shown in FIG. 8, the left side of the repeater 800 can include a RX beamforming array, while the right side can include a TX beamforming array. The receive filter 820 can follow the RX beamforming array and the transmit filter 822 can precede the TX beamforming array.

Between the receive filter 820 and the transmit filter 822 is the mixer 802, which is being fed a clock, e.g., clock 890, as shown using the dashed line near the bottom of repeater 800. This clock 890 can allow the mixing or heterodyning to take place at the mixer 802. As mentioned previously, the mixer 802 can produce two different signals, e.g., a signal including frequency $f_{RF}+f_{LO}$ and a signal including frequency $f_{RF}-f_{LO}$. As such, mixer 802 can produce two copies of the desired signal. As mentioned above, repeaters herein may utilize a post mixing filter that determines the desired frequency out of the two frequencies produce by the mixer 802. After determining the desired frequency, the repeater 800 can then send the desired frequency to the transmit array.

As mentioned above, there can be a secondary link controller, e.g., based on different RAT than the link used by RX array 804, which can be used as a reference to produce a clock, e.g., reference clock $f_{REF}$. Accordingly, the repeater can utilize two separate clocks, e.g., clock 890 and reference clock $f_{REF}$. In some aspects, these separate clocks may be synchronized with each other. The aforementioned secondary link can help link these clocks. In some instance, if the secondary link is connects to a base station, then the clock from the secondary link can be utilized to produce a reference, e.g., reference clock $f_{REF}$ from the secondary link.

As mentioned above, the programmable dividers 882 (n) and 884 (m) may help to divide and control the clocks. These programmable dividers can also help to adjust the frequency at VCO 872. By dividing the clock signal and reference signals, e.g., by variable ratios, aspects of the present disclosure may help the VCO 872 to move to a different frequency. Additionally, the frequency discriminator 874 can compare clock 890 with the reference clock $f_{REF}$. Frequency discriminator 874 can also be referred to as a frequency detector, phase detector, or phase frequency detector. The frequency discriminator 874 can determine a difference between the two clocks, and then filter the signals, e.g., with the loop filter 870. This error or difference between the clocks can be tuned by VCO 872. This difference can be either a timing error or a frequency error. In some aspects, repeater 800 can continuously to monitor or compare the clock 890 and the reference clock $f_{REF}$, e.g., in order to maintain synchronization between them. Aspects of the present disclosure may synchronize these clocks because otherwise there may be a separation between the timing at the repeater and the base station.

Figure 9:
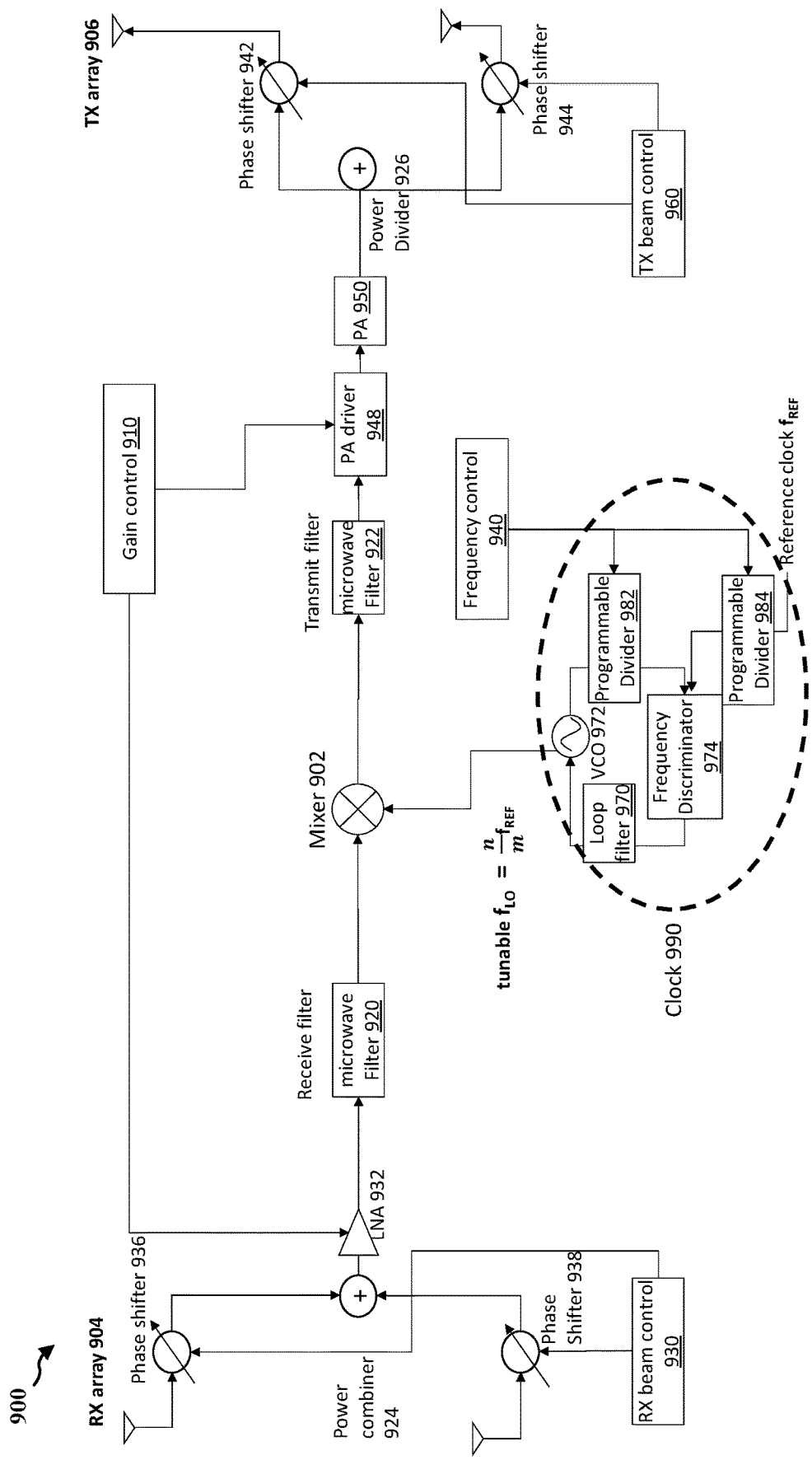
FIG. 9 illustrates an example repeater in accordance with aspects of the present disclosure.

FIG. 9 illustrates an example repeater or phased array repeater 900 in accordance with aspects of the present disclosure. As shown in FIG. 9, repeater 900 includes a RX array 904, e.g., including RX antenna 1 through RX antenna N, as well as TX array 906, e.g., including TX antenna 1 through TX antenna N. As shown in FIG. 9, repeater 900 also includes mixer or heterodyner 902, gain control 910, receive filter or microwave filter 920, and transmit filter or microwave filter 922. Repeater 900 also includes power combiner 924, power divider 926, RX beam control unit 930, LNA 932, phase shifter 936, phase shifter 938, frequency control unit 940, phase shifter 942, phase shifter 944, PA driver 948, PA 950, and TX beam control unit 960.

Repeater 900 also includes loop filter 970, VCO 972, frequency discriminator 974, programmable divider 982, programmable divider 984, and clock 990. As shown in FIG. 9, reference clock $f_{REF}$ is connected to the programmable divider 984. Programmable divider 982 can divide by a parameter n and programmable divider 984 can divide by a parameter m. Additionally, repeater 900 can include a tunable $f_{LO}$ that is based on (n/m) multiplied by $f_{REF}$.

FIG. 9 displays another example of a repeater 900 according to the present disclosure. In repeater 900, the LNA 932 is moved from the start of the RX array 904 to after the power combiner 924. Repeater 900 is a phased array repeater with a single LNA and PA, e.g., LNA 932 and PA 950. Accordingly, repeater 900 includes the LNA 932 and the PA 950 into the middle of the repeater between the RX array 904 and TX array 906.

Figure 10:
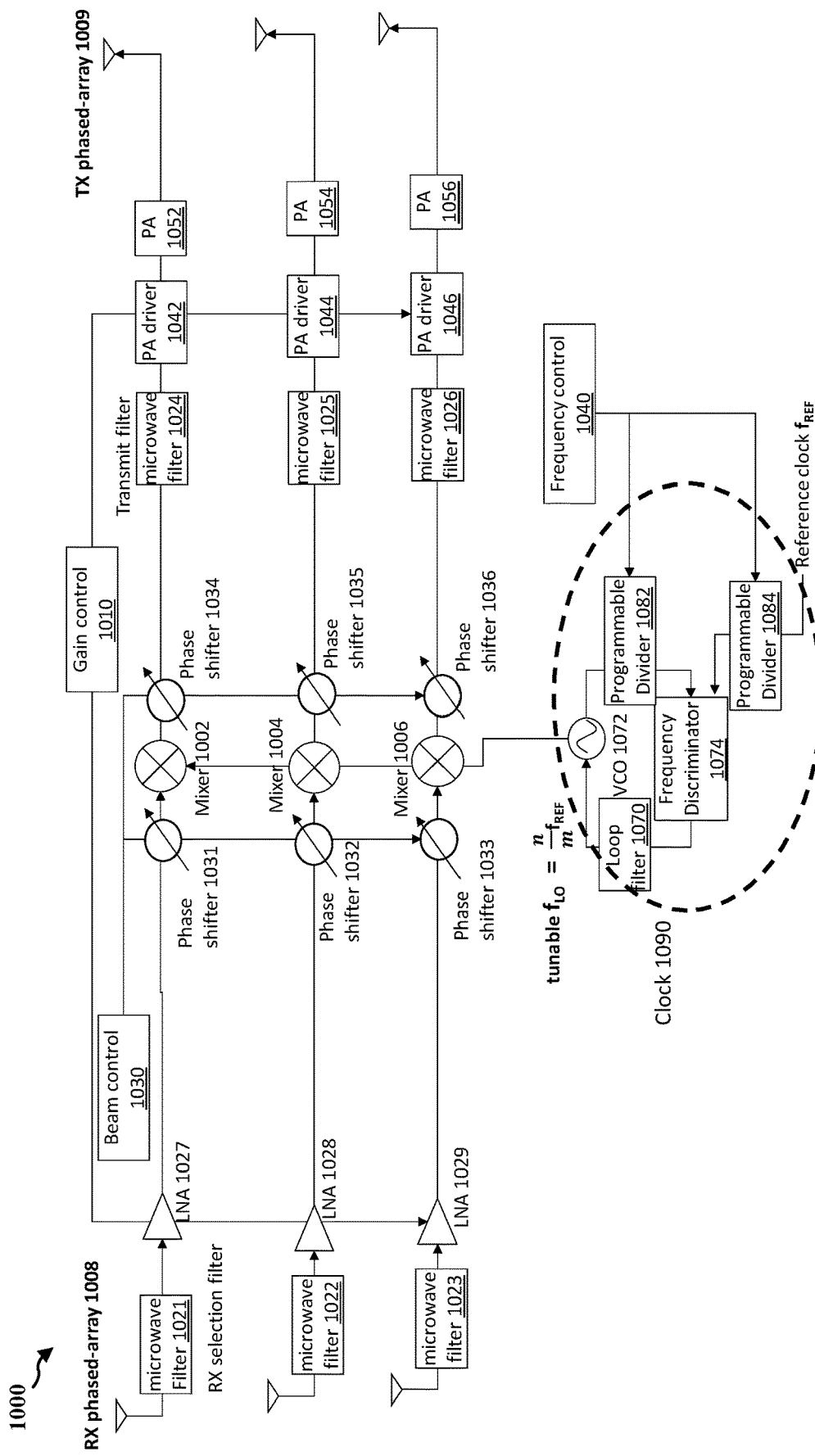
FIG. 10 illustrates an example repeater in accordance with aspects of the present disclosure.

FIG. 10 illustrates an example repeater or phased array repeater 1000 in accordance with aspects of the present disclosure. As shown in FIG. 10, repeater 1000 includes a RX phased-array 1008 including RX antenna 1 through RX antenna N, as well as TX phased-array 1009 including TX antenna 1 through TX antenna N. As shown in FIG. 10, repeater 1000 also includes mixer or heterodyner 1002, mixer or heterodyner 1004, mixer or heterodyner 1006, gain control 1010, receive filters or microwave filters 1021-1023, and transmit filters or microwave filters 1024-1026. Repeater 1000 also includes LNA 1027, LNA 1028, LNA 1029, beam control unit 1030, phase shifters 1031-1036, frequency control unit 1040, PA driver 1042, PA driver 1044, PA driver 1046, PA 1052, PA 1054, and PA 1056.

Moreover, repeater 1000 includes loop filter 1070, VCO 1072, frequency discriminator 1074, programmable divider 1082, programmable divider 1084, and clock 1090. As shown in FIG. 10, reference clock $f_{REF}$ is connected to the programmable divider 1084. Programmable divider 1082 can divide by a parameter n and programmable divider 1084 can divide by a parameter m. Also, repeater 1000 can include a tunable $f_{LO}$ that is based on (n/m) multiplied by $f_{REF}$.

FIG. 10 displays another example of a repeater 1000 according to the present disclosure. In contrast to FIGS. 8 and 9, repeater 1000 in FIG. 10 does not include a power combiner or divider. Further, the microwave filters are moved into the RX and TX array branch. There is also no summation in this repeater example. Additionally, there are multiple mixers or heterodyners 1002,1004,1006. However, mixers or heterodyners 1002,1004,1006 can be combined.

Figure 11:
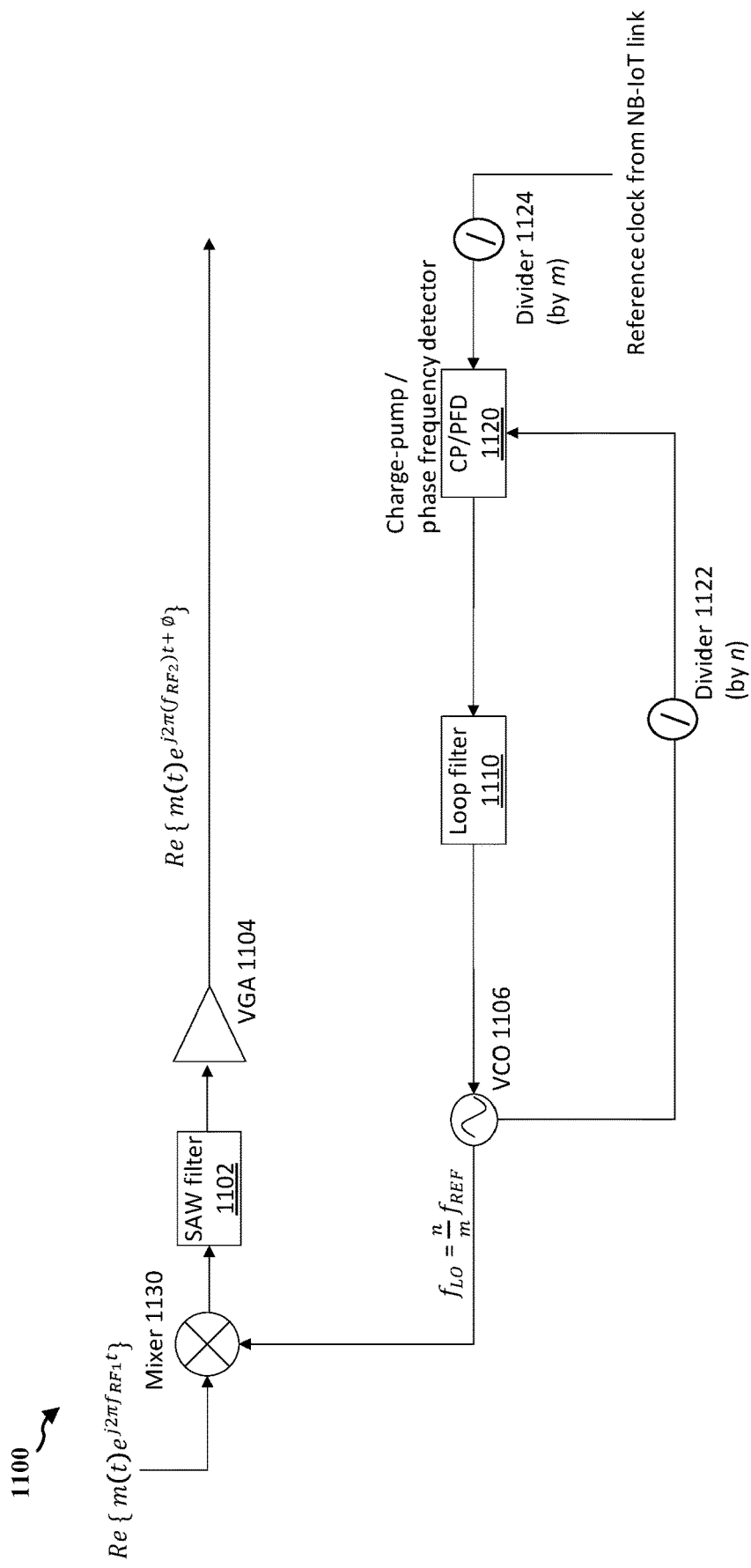
FIG. 11 illustrates an example repeater in accordance with aspects of the present disclosure.

FIG. 11 illustrates an example repeater or phased array repeater 1100 in accordance with aspects of the present disclosure. For instance, FIG. 11 shows a portion of repeater 1100. Repeater 1100 includes a surface acoustic wave (SAW) filter 1102, a variable gain amplifier (VGA) 1104, VCO 1106, loop filter 1110, charge-pump (CP) or phase frequency detector (PFD) 1120, divider 1122, divider 1124, and mixer or heterodyner 1130.

As shown in FIG. 11, VCO 1106 is divided by the divider 1122 (which is programmable and divides by a parameter n) and the reference clock from the NB-IoT link is divided by the divider 1124 (which is programmable and divides by a parameter m). These dividers 1122,1124 are programmable, e.g., by the base station, and help to scale the two clocks. The VCO 1106 is being divided by a certain frequency. As mentioned above, when a clock comparison is performed, the clocks may be synchronized. For instance, if the frequencies from both clocks are scaled, then a more accurate clock comparison will be produced. Also, the secondary link may be a lower frequency link than the link on which the communication for the UE is received from the base station, and the VCO 1106 can operate at a higher frequency. As such, aspects of the present disclosure may synchronize these two links to the same frequency. In some aspects, when the control link is established first, this link may be carrier-frequency locked to base station, e.g., at lower frequency. In further aspects, the secondary link may utilize its RF or reference clock as input to a high-frequency synthesizer $f_{LO}$. Accordingly, FIG. 11 can display a fractional-N synthesizer.

Aspects of the present disclosure can also include repeaters that utilize meta-materials, which are any material of tunable electrical permittivity and/or magnetic permeability. Meta-materials are man-made materials that do not occur in nature. Additionally, meta-materials can be made by utilizing nano-fabrication methods. In some aspects, components in the RF chain can be designed with meta-materials. For example, the following components can be designed with meta-materials: antennas, switches, phase-shifters, waveguides, couplers, filters or resonators, oscillators, and duplexers or circulators. Also, the refractive index can be a function of permittivity and permeability. The meta-materials can be designed for negative permittivity and/or permeability, and negative refractive index.

Meta-materials may also be referred to as: left-handed materials, epsilon negative (ENG) materials, double-negative materials, negative refractive index, and/or chiral materials. Some potential applications for meta-materials are: electrically small antennas (e.g., smaller than λ/10) that retain high efficiency and bandwidth, radio-transparent antennas to allow antenna stacking, limit scatter and mutual coupling, phased-shifters implemented by tuning the dielectric of waveguides, and/or non-magnetic circulators for duplexing. Meta-materials can also lower insertion loss, as well as be designed for circuits from sub-6 GHz to several THz. Meta-materials can also allow for low power consumption. Further, meta-materials can be used with super-resolution lenses that operate below the diffraction limit.

Figure 12:
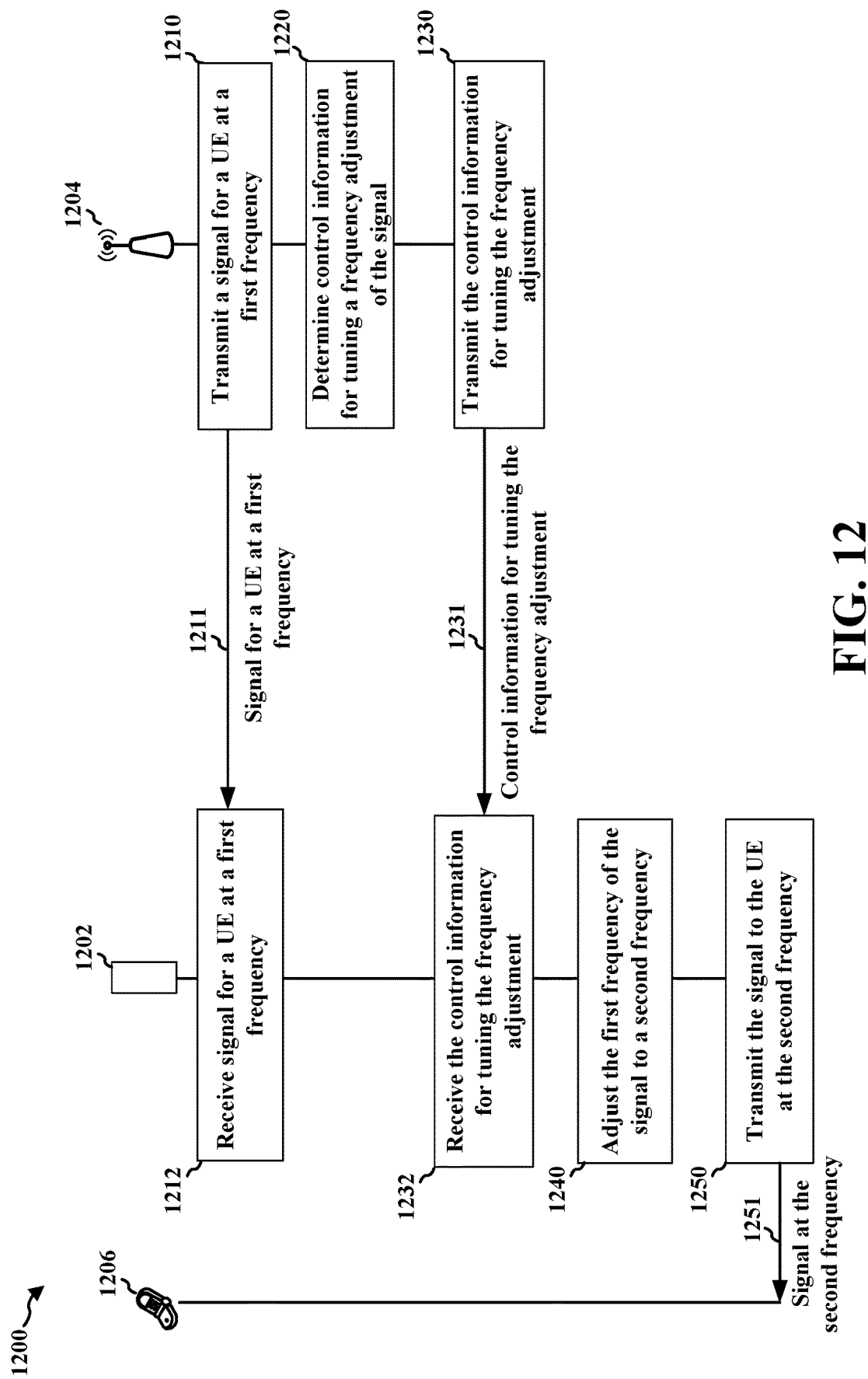
FIG. 12 is a diagram illustrating transmissions between a base station, a repeater, and a UE.

FIG. 12 is a diagram illustrating transmissions between repeater or phased array repeater 1202, base station 1204, and UE 1206. For instance, base station 1204 can transmit 1210 a signal 1211 for UE 1206 at a first frequency. Also, repeater 1202 can receive 1212 the signal 1211 for UE 1206 at a first frequency. Base station 1204 can also determine 1220 control information 1231 for tuning a frequency adjustment of the signal at repeater 1202. Additionally, base station 1204 can also transmit 1230 the control information 1231 for tuning a frequency adjustment of the signal at repeater 1202. Likewise, repeater 1202 can receive 1232 the control information 1231 for tuning a frequency adjustment of the signal.

Repeater 1202 can also adjust 1240 the first frequency of the signal to a second frequency, where the first frequency can be adjusted by heterodyning. In some aspects, the adjustment to the first frequency can be tunable, such that a frequency separation between the first frequency and the second frequency can be adjusted. Repeater 1202 can also tune the frequency separation between the first frequency and the second frequency based on the frequency control information. In some aspects the signal can be received from the base station 1204 via a first link based on a first radio access technology (RAT). Further, the frequency control information can be received from the base station 1204 via a second link based on a second RAT. Additionally, the first RAT can comprises mmW communication, and the second RAT can comprise one of NB-IoT communication, Wi-Fi communication, Bluetooth communication, or a communication at a frequency lower than mmW frequency.

In some aspects, the repeater 1202 can generate a double sideband (DSB) signal including a pair of single sidebands (SSBs) by heterodyning, where one of the pair of SSBs is at the second frequency. Further, repeater 1202 can select one sideband from the pair of SSBs generated by heterodyning. The repeater 1202 can also receive, from the base station, control information regarding adjusting the first frequency of the signal. In some aspects, the second frequency can be selected from one of the pair of SSBs based on the control information. Also, the repeater 1202 can filter the signal from the base station 1204 prior to adjusting the first frequency to the second frequency. In some aspects, the adjustment to the first frequency of the signal can be performed by the repeater 1202. Also, the adjustment to the first frequency can be based on a clock at the repeater 1202 and a reference clock received from the base station 1204. Moreover, the adjustment to the first frequency can be based on a ratio of programmable variables received from the base station 1204.

In some aspects, the signal can be received via a first antenna array comprising one or more distributed LNAs, and the signal can be transmitted via a second antenna array comprising one or more distributed PAs. Also, the signal can be received via a first antenna array comprising a shared LNA, and the signal can be transmitted via a second antenna array comprising a shared PA. In some aspects, the signal can be received via a first antenna array, where the signal can be transmitted via a second antenna array, and two or more heterodyners can be between the first antenna array and the second antenna array. Additionally, the signal can be received, adjusted, or transmitted via one or more components including an antenna array, a switch, a coupler, a combiner or splitter, a filter, a phase-shifter, a duplexer, an oscillator, or a connecting element. In some aspects, the one or more components can comprise a meta-material or at least one material with a tunable permittivity or permeability.

Additionally, the repeater 1202 can transmit 1250 the signal 1251 to the UE at the second frequency.

Figure 13:
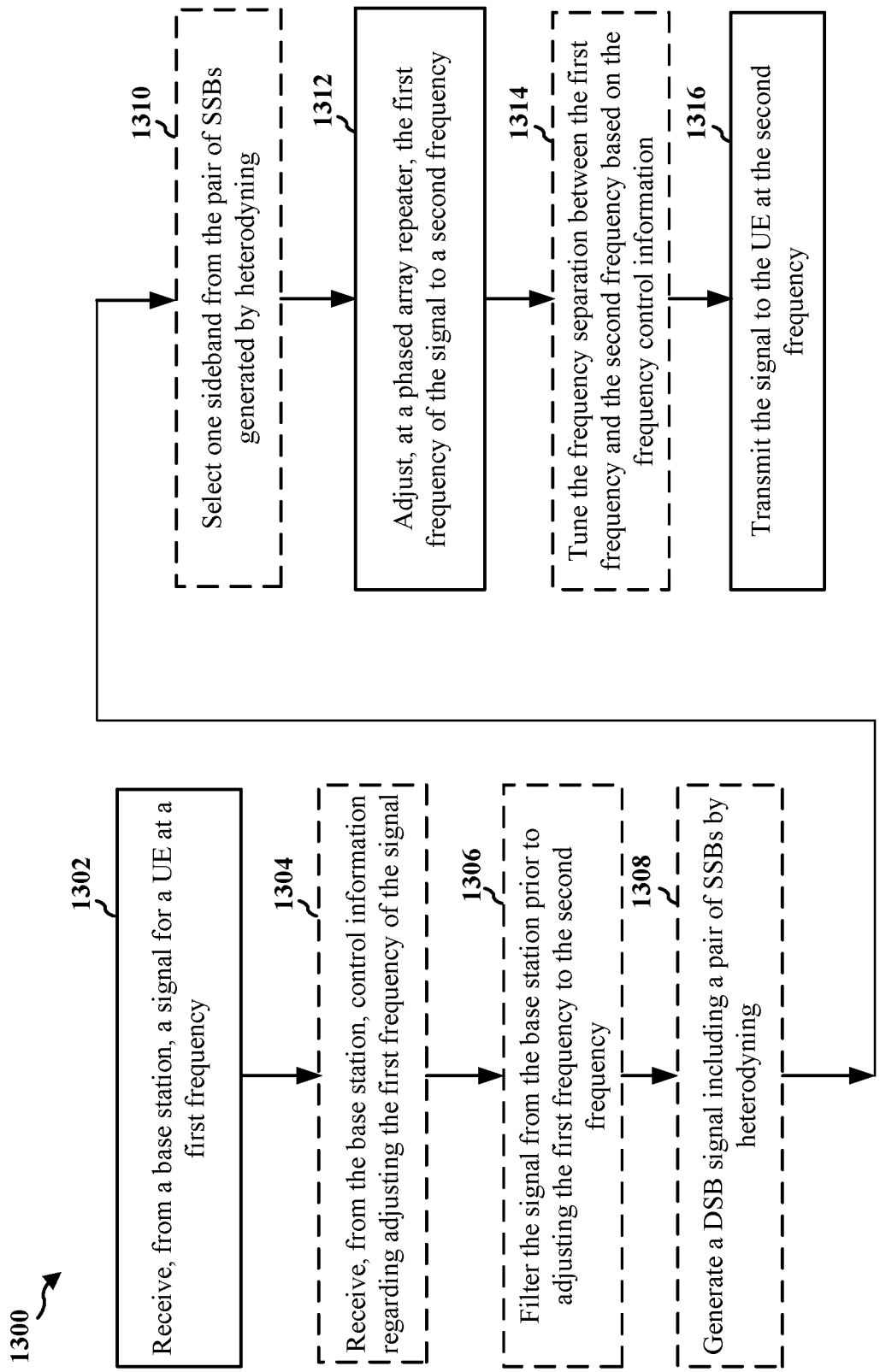
FIG. 13 is a flowchart of a method of wireless communication.

FIG. 13 is a flowchart 1300 of a method of wireless communication. The method may be performed by a repeater or phased array repeater (e.g., repeater 800, 900, 1000, 1100, 1202, apparatus 1402) communicating with a base station (e.g., base station 102, 180, 310, 1204, 1450) and a UE (e.g., UE 104, 350, 1206, 1460). Optional aspects are illustrated with a dashed line. The methods described herein can provide a number of benefits, such as improving communication signaling and/or resource utilization.

At 1302, the repeater may receive communication for a UE at a first frequency, as described in connection with the examples in FIGS. 6A-6D, 7A, 7B, 8, 9, 10, and 11. For example, reception component 1404 of apparatus 1402 may receive a signal or communication for a UE at a first frequency. At 1304, the repeater can also receive control information for tuning a frequency adjustment of the communication, as described in connection with the examples in FIGS. 6A-6D, 7A, 7B, 8, 9, 10, and 11. For example, reception component 1404 of apparatus 1402 may also receive control information for tuning a frequency adjustment of the signal. At 1306, the repeater can filter the signal from the base station prior to adjusting the first frequency to the second frequency, as described in connection with the examples in FIGS. 6A-6D, 7A, 7B, 8, 9, 10, and 11. For example, filtering component 1406 of apparatus 1402 may filter the signal from the base station. At 1308, the repeater can generate a double sideband (DSB) signal including a pair of single sidebands (SSBs) by heterodyning, where one of the pair of SSBs is at the second frequency, as described in connection with the examples in FIGS. 6A-6D, 7A, 7B, 8, 9, 10, and 11. For example, generation component 1408 of apparatus 1402 may generate a pair of SSBs by heterodyning. At 1310, the repeater can select one sideband from the pair of SSBs generated by heterodyning, as described in connection with the examples in FIGS. 6A-6D, 7A, 7B, 8, 9, 10, and 11. For example, selection component 1410 of apparatus 1402 may select one sideband from the pair of SSBs. The repeater can also receive, from the base station, control information regarding adjusting the first frequency of the signal, as described in connection with the examples in FIGS. 6A-6D, 7A, 7B, 8, 9, 10, and 11. In some aspects, the second frequency can be selected from one of the pair of SSBs based on the control information, as described in connection with the examples in FIGS. 6A-6D, 7A, 7B, 8, 9, 10, and 11.

At 1312, the repeater or phased array repeater can adjust the first frequency of the signal to a second frequency, where the first frequency can be adjusted by heterodyning, as described in connection with the examples in FIGS. 6A-6D, 7A, 7B, 8, 9, 10, and 11. For example, adjustment component 1412 of apparatus 1402 may adjust the first frequency of the signal to a second frequency. In some aspects, the adjustment to the first frequency can be tunable, such that a frequency separation between the first frequency and the second frequency can be adjusted, as described in connection with the examples in FIGS. 6A-6D, 7A, 7B, 8, 9, 10, and 11. At 1314, the repeater can also tune the frequency separation between the first frequency and the second frequency based on the frequency control information, as described in connection with the examples in FIGS. 6A-6D, 7A, 7B, 8, 9, 10, and 11. For example, adjustment component 1412 of apparatus 1402 may tune the frequency separation between the first frequency and the second frequency based on the frequency control information. In some aspects the signal can be received from the base station via a first link based on a first RAT, as described in connection with the examples in FIGS. 6A-6D, 7A, 7B, 8, 9, 10, and 11. Further, the frequency control information can be received from the base station via a second link based on a second RAT, as described in connection with the examples in FIGS. 6A-6D, 7A, 7B, 8, 9, 10, and 11. Additionally, the first RAT can comprises mmW communication, and the second RAT can comprise one of NB-IoT communication, Wi-Fi communication, Bluetooth communication, or a communication at a frequency lower than mmW frequency, as described in connection with the examples in FIGS. 6A-6D, 7A, 7B, 8, 9, 10, and 11.

In some aspects, the adjustment to the first frequency of the signal can be performed by the repeater, as described in connection with the examples in FIGS. 6A-6D, 7A, 7B, 8, 9, 10, and 11. Also, the adjustment to the first frequency can be based on a clock at the phased array repeater and a reference clock received from the base station, as described in connection with the examples in FIGS. 6A-6D, 7A, 7B, 8, 9, 10, and 11. Moreover, the adjustment to the first frequency can be based on a ratio of programmable variables received from the base station, as described in connection with the examples in FIGS. 6A-6D, 7A, 7B, 8, 9, 10, and 11.

In some aspects, the phased array repeater includes one or more distributed low noise amplifiers (LNAs) and one or more distributed power amplifiers (PAs), as described in connection with the examples in FIGS. 6A-6D, 7A, 7B, 8, 9, 10, and 11. Also, the phased array repeater may include a shared LNA and a shared PA, as described in connection with the examples in FIGS. 6A-6D, 7A, 7B, 8, 9, 10, and 11. In some aspects, the signal can be received via a first antenna array, where the signal can be transmitted via a second antenna array, and two or more heterodyners can be between the first antenna array and the second antenna array, as described in connection with the examples in FIGS. 6A-6D, 7A, 7B, 8, 9, 10, and 11. Additionally, the signal can be received, adjusted, or transmitted via one or more components including an antenna array, a switch, a coupler, a combiner or splitter, a filter, a phase-shifter, a duplexer, an oscillator, or a connecting element, where the one or more components can comprise a meta-material or at least one material with a tunable permittivity or permeability, as described in connection with the examples in FIGS. 6A-6D, 7A, 7B, 8, 9, 10, and 11.

At 1316, the repeater can transmit the signal to the UE at the second frequency, as described in connection with the examples in FIGS. 6A-6D, 7A, 7B, 8, 9, 10, and 11. For example, transmission component 1414 of apparatus 1402 may transmit the signal to the UE at the second frequency.

Figure 14:
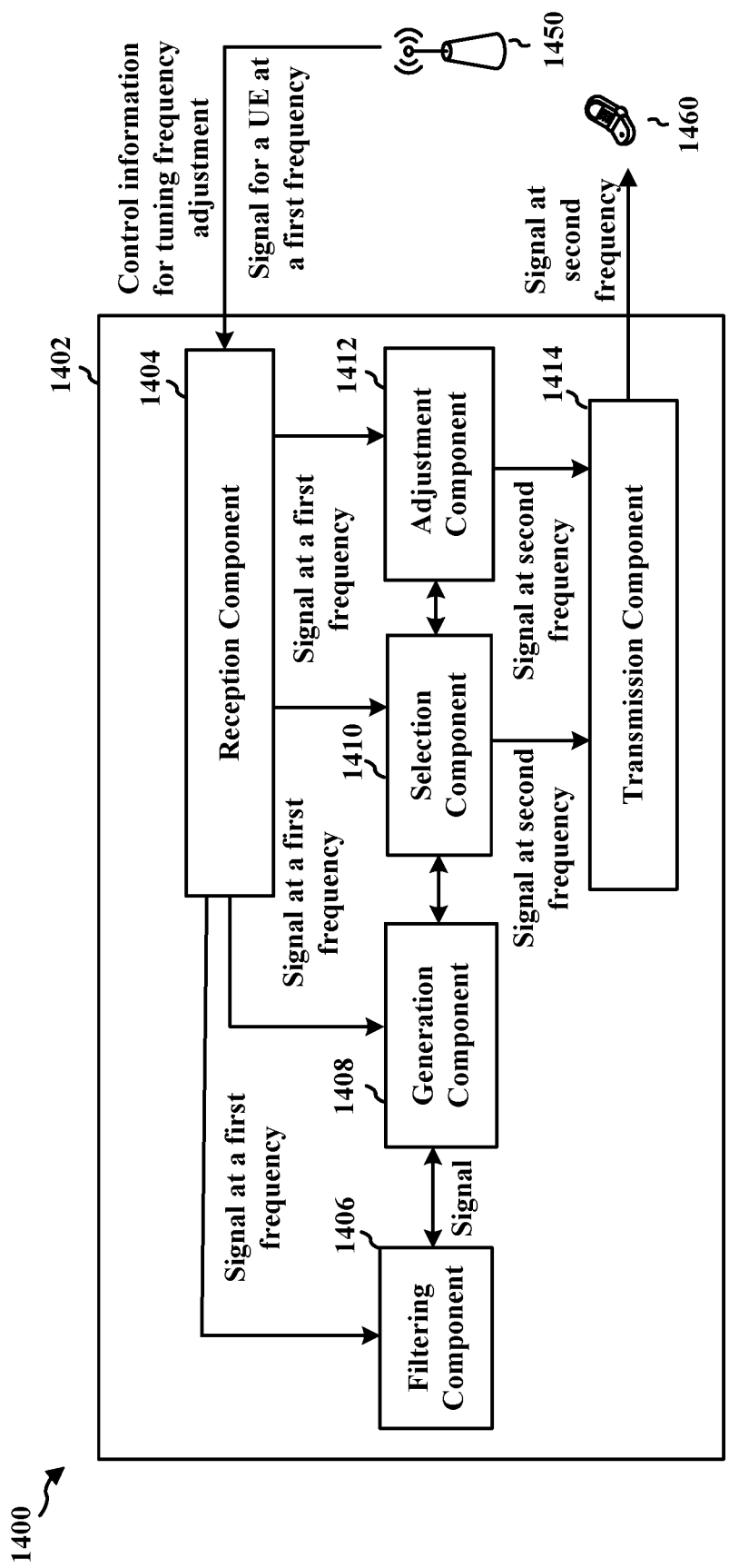
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus may be a repeater or phased array repeater. The apparatus includes a reception component 1404 configured to receive a signal for a UE at a first frequency, e.g., as described in connection with step 1302 above. Reception component 1404 can also be configured to receive control information for tuning a frequency adjustment of the signal, e.g., as described in connection with step 1304 above. The apparatus includes a filtering component 1406 configured to filter the signal from the base station, e.g., as described in connection with step 1306 above. The apparatus includes a generation component 1408 configured to generate a double sideband (DSB) signal including a pair of single sidebands (SSBs) by heterodyning, e.g., as described in connection with step 1308 above. The apparatus includes a selection component 1410 configured to select one sideband from the pair of SSBs, e.g., as described in connection with step 1310 above. The apparatus includes adjustment component 1412 configured to adjust the first frequency of the signal to a second frequency, e.g., as described in connection with step 1312 above. The apparatus includes a transmission component 1414 configured to transmit the signal to the UE at the second frequency, e.g., as described in connection with step 1316 above.

The apparatus may include additional components that perform each of the blocks of the algorithm in the aforementioned flowcharts of FIGS. 12 and 13. As such, each block in the aforementioned flowcharts of FIGS. 12 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
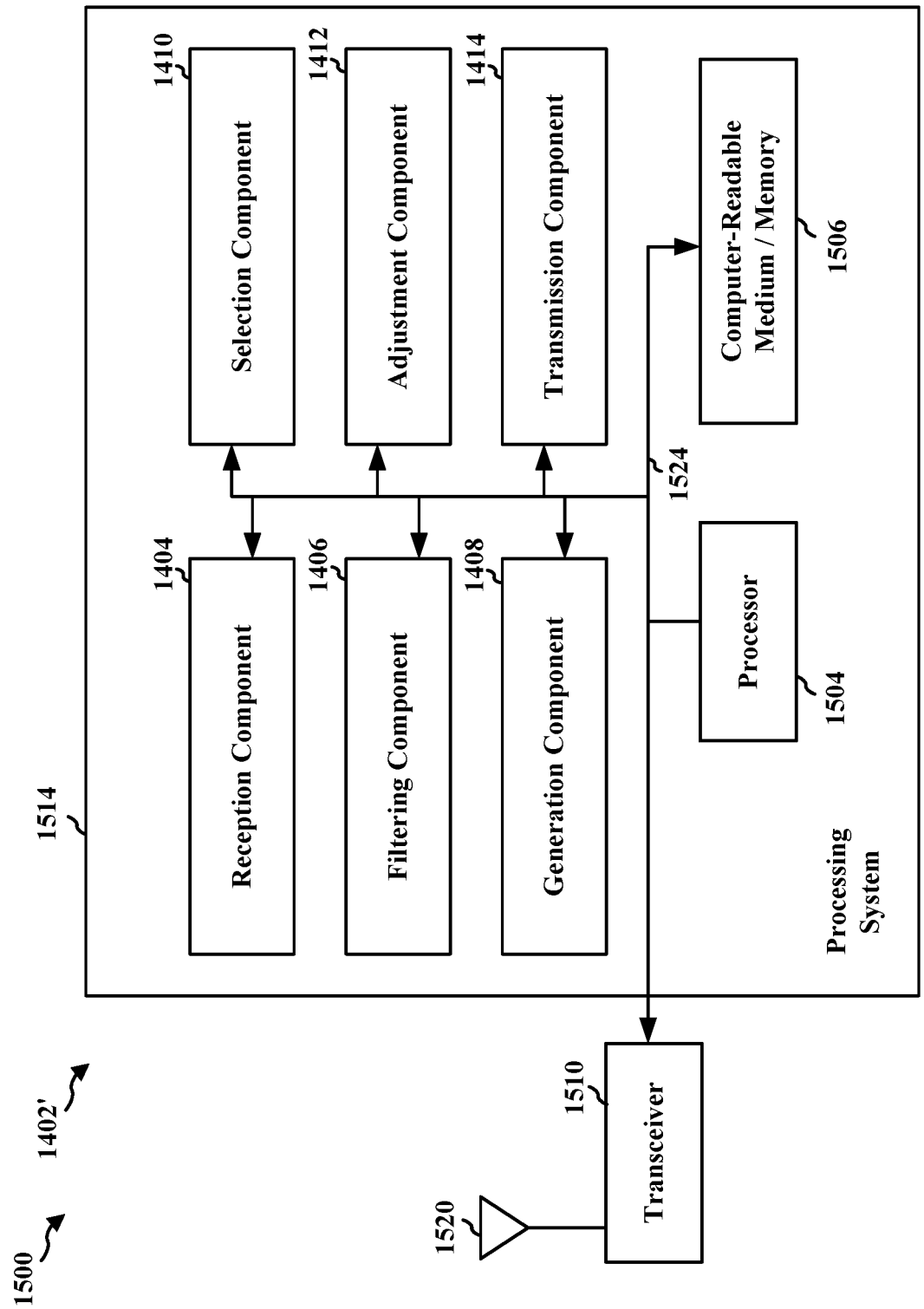
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1414, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414. The components may be software components running in the processor 1504, resident/stored in the computer readable medium/memory 1506, one or more hardware components coupled to the processor 1504, or some combination thereof.

Figure 16:
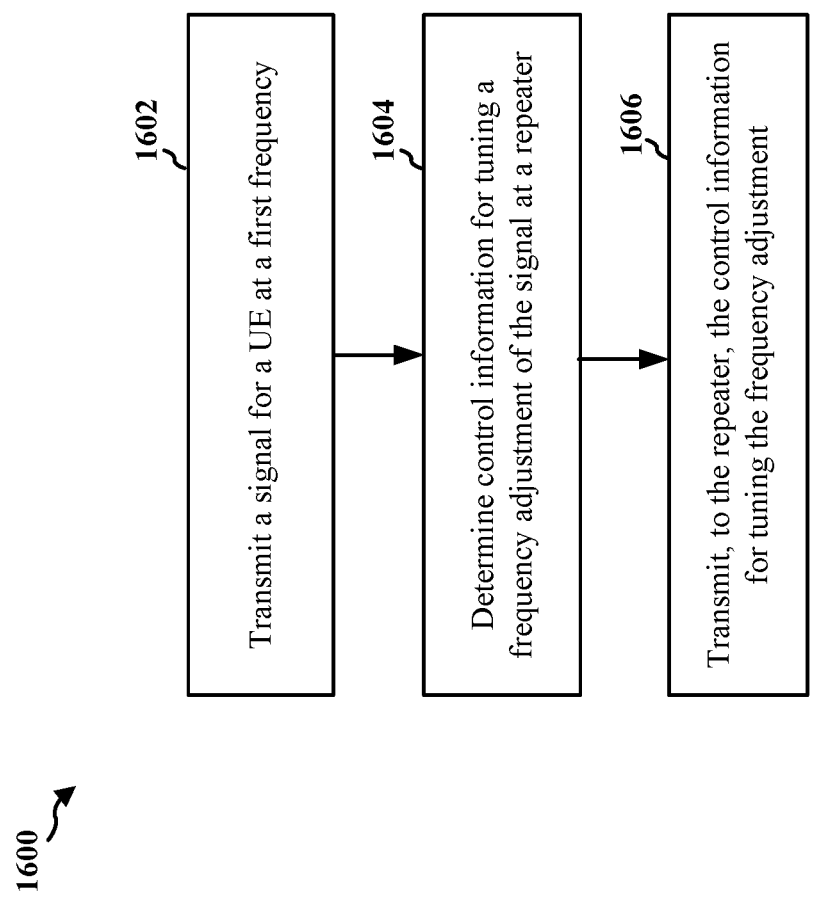
FIG. 16 is a flowchart of a method of wireless communication.

FIG. 16 is a flowchart 1600 of a method of wireless communication. The method may be performed by a base station (e.g., base station 102, 180, 310, 1204; the apparatus 1702; the processing system 1814, which may include the memory 376 and which may be the entire base station 310 or a component of a base station, such as the TX processor 316, the RX processor 370, and/or the controller/processor 375) communicating with a repeater or phased array repeater (e.g., repeater 800, 900, 1000, 1100, 1200, 1202, 1750, apparatus 1402) and a UE (e.g., UE 104, 350, 1206, 1460). Once again, optional aspects may be illustrated with a dashed line. The methods described herein can provide a number of benefits, such as improving communication signaling and/or resource utilization.

At 1602, the base station can transmit a signal or communication for a UE at a first frequency, as described in connection with the examples in FIGS. 6A-6D, 7A, 7B, 8, 9, 10, and 11. For example, transmission component 1708 of apparatus 1702 may transmit a signal for a UE at a first frequency. At 1604, the base station can determine control information for tuning a frequency adjustment of the signal at repeater, as described in connection with the examples in FIGS. 6A-6D, 7A, 7B, 8, 9, 10, and 11. For example, determination component 1706 of apparatus 1702 may determine control information for tuning a frequency adjustment of the signal at a repeater. At 1606, the base station can also transmit the control information for tuning a frequency adjustment of the signal at a repeater, as described in connection with the examples in FIGS. 6A-6D, 7A, 7B, 8, 9, 10, and 11. For example, transmission component 1708 of apparatus 1702 may transmit the control information for tuning a frequency adjustment of the signal at a repeater.

Also, the control information can include information regarding adjusting the first frequency to a second frequency, as described in connection with the examples in FIGS. 6A-6D, 7A, 7B, 8, 9, 10, and 11. In some aspects, the signal can be transmitted via a first link based on a first RAT, as described in connection with the examples in FIGS. 6A-6D, 7A, 7B, 8, 9, 10, and 11. Further, the frequency control information can be transmitted via a second link based on a second RAT, as described in connection with the examples in FIGS. 6A-6D, 7A, 7B, 8, 9, 10, and 11. Additionally, the first RAT can comprise mmW communication, and the second RAT can comprise one of NB-IoT communication, Wi-Fi communication, Bluetooth communication, or a communication at a frequency lower than mmW frequency, as described in connection with the examples in FIGS. 6A-6D, 7A, 7B, 8, 9, 10, and 11. Also, the communication can be transmitted via one or more components including an antenna array, a switch, a coupler, a combiner or splitter, a filter, a phase-shifter, a duplexer, an oscillator, or a connecting element, where the one or more components can comprise a meta-material or at least one material with a tunable permittivity or permeability, as described in connection with the examples in FIGS. 6A-6D, 7A, 7B, 8, 9, 10, and 11. In some aspects, the repeater can be a phased array repeater, as described in connection with the examples in FIGS. 6A-6D, 7A, 7B, 8, 9, 10, and 11.

Figure 17:
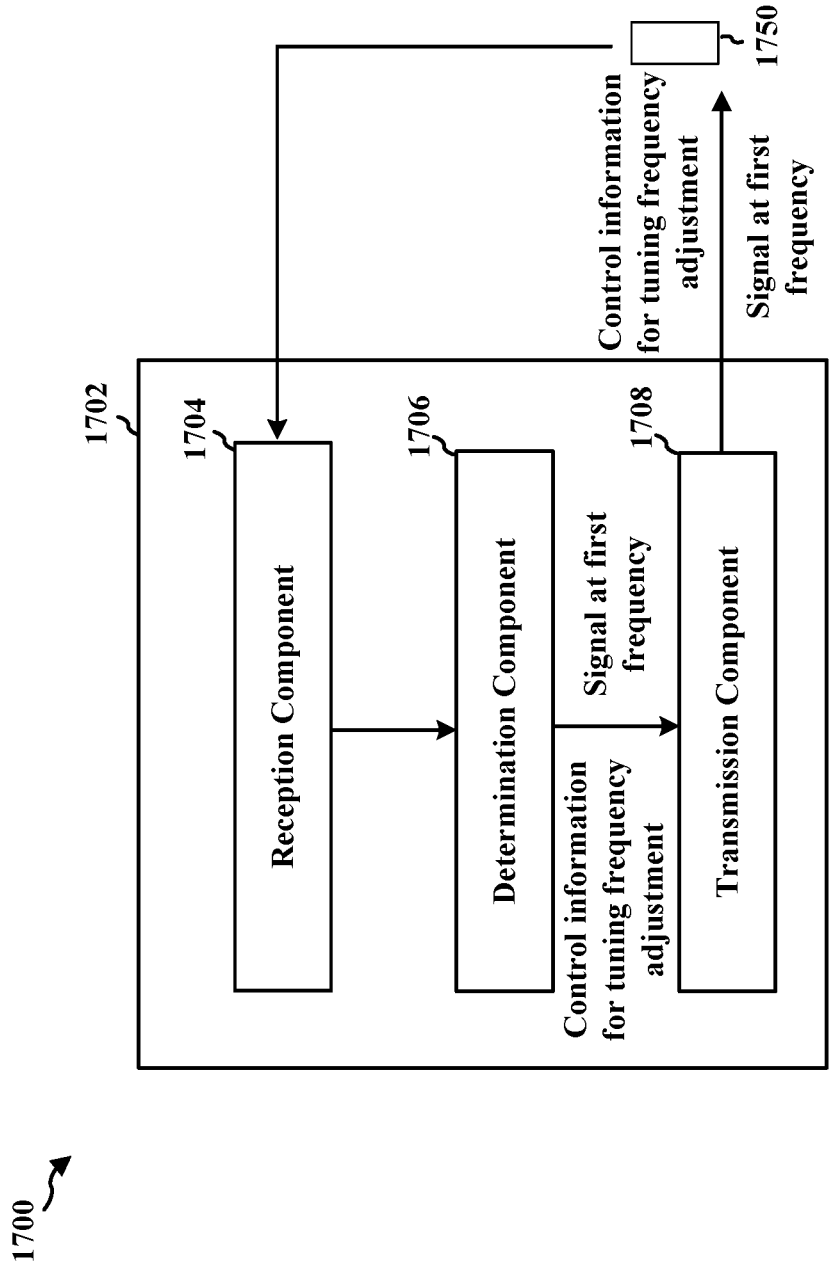
FIG. 17 is a conceptual data flow diagram illustrating the data flow between different means/components in an example apparatus.

FIG. 17 is a conceptual data flow diagram 1700 illustrating the data flow between different means/components in an example apparatus 1702. The apparatus may be a base station. The apparatus includes a reception component 1704 that is configured to receive communication or a signal from other components, e.g., a repeater or phased array repeater and/or UE. The apparatus includes a determination component 1706 configured to determine control information for tuning a frequency adjustment of the signal at a repeater, e.g., as described in connection with step 1604 above. The apparatus includes a transmission component 1708 configured to transmit a signal for a UE at a first frequency, e.g., as described in connection with step 1602 above. Transmission component 1708 is also configured to transmit the control information for tuning a frequency adjustment of the signal at a repeater, e.g., as described in connection with step 1606 above.

The apparatus may include additional components that perform each of the blocks of the algorithm in the aforementioned flowcharts of FIGS. 12 and 16. As such, each block in the aforementioned flowcharts of FIGS. 12 and 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
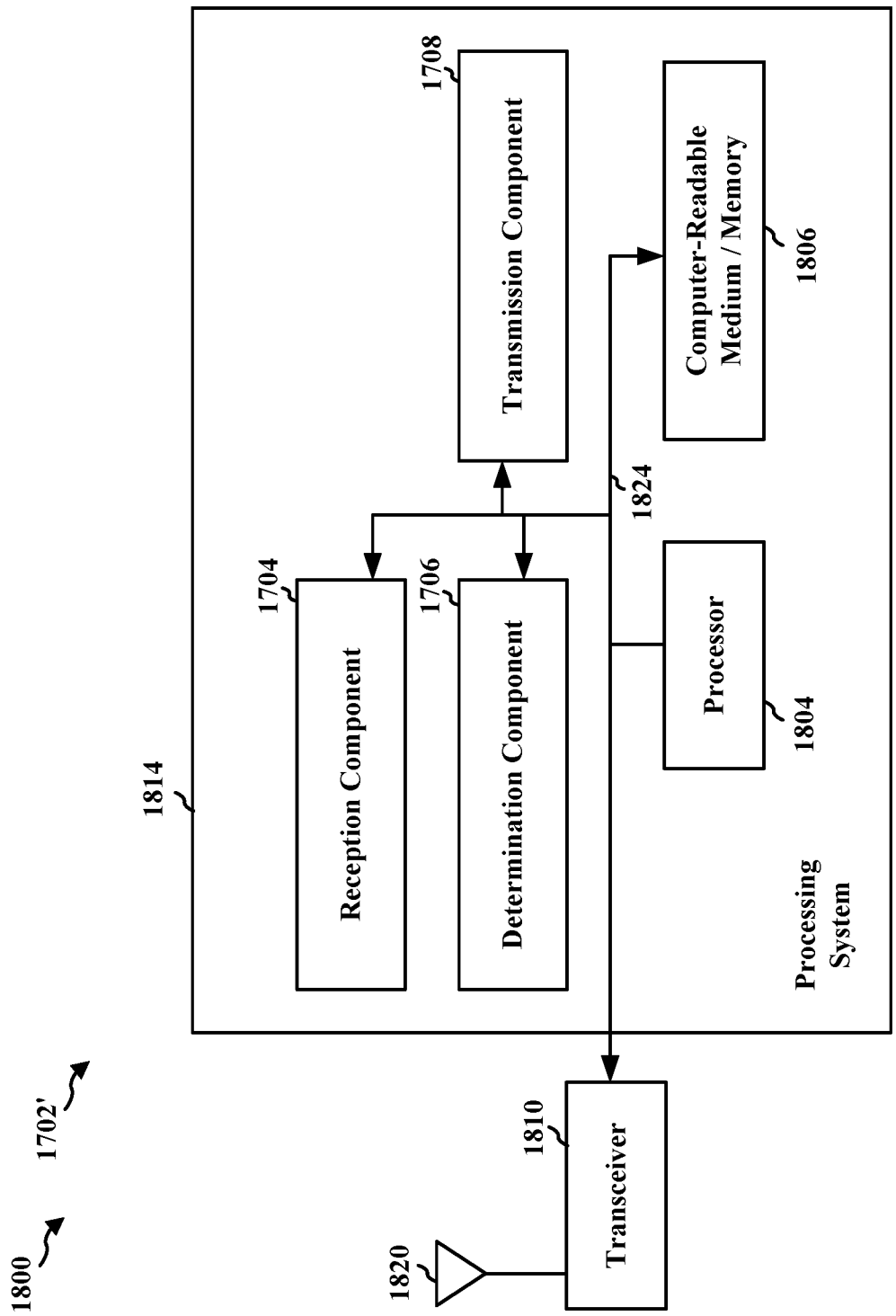
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1708, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708. The components may be software components running in the processor 1804, resident/stored in the computer readable medium/memory 1806, one or more hardware components coupled to the processor 1804, or some combination thereof.

The processing system 1814 may be a component of the base station 310 and may include the memory 376 and/or at least one of the TX processor 316, the RX processor 370, and the controller/processor 375. Alternatively, the processing system 1814 may be the entire base station (e.g., see 310 of FIG. 3).

In one configuration, the apparatus 1702/1702' for wireless communication includes means for transmitting a signal for a UE at a first frequency. The apparatus can also include means for determining control information for tuning a frequency adjustment of the signal at a repeater. The apparatus can also include means for transmitting, to the repeater, the control information for tuning the frequency adjustment. The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Aspects of the present disclosure described herein can provide a number of benefits, such as improving communication signaling. For instance, repeaters described herein can improve the reception or transmission of communication or signaling, e.g., by avoiding or translating around signal blockers or signal jammers, such as through heterodyning and/or filtering. Further, aspects of the present disclosure can improve resource utilization, as the communication or signal quality can increase based on the aforementioned repeaters, which may allow for reduced channel or signal usage.

The following examples are illustrative only and aspects thereof may be combined with aspects of other embodiments or teaching described herein, without limitation.

Example 1 is a method of wireless communication at a phased array repeater, comprising receiving, from a base station, a signal for a user equipment (UE) at a first frequency; adjusting, at the phased array repeater, the first frequency of the signal to a second frequency, wherein the first frequency is adjusted by heterodyning; and transmitting the signal to the UE at the second frequency.

In Example 2, the method of Example 1 further includes that the adjustment to the first frequency is tunable, such that a frequency separation between the first frequency and the second frequency can be adjusted.

In Example 3, the method of Example 1 or 2 further includes receiving frequency control information from the base station; and tuning the frequency separation between the first frequency and the second frequency based on the frequency control information.

In Example 4, the method of any of Examples 1-3 further includes that the signal is received from the base station via a first link based on a first radio access technology (RAT), and wherein the frequency control information is received from the base station via a second link based on a second RAT.

In Example 5, the method of any of Examples 1-4 further includes that the first RAT comprises millimeter wave (mmW) communication, and wherein the second RAT comprises one of narrowb and internet of things (NB-IoT) communication, Wi-Fi communication, Bluetooth communication, or a communication at a frequency lower than mmW frequency.

In Example 6, the method of any of Examples 1-5 further includes that the phased array repeater includes one or more distributed low noise amplifiers (LNAs) and one or more distributed power amplifiers (PAs).

In Example 7, the method of any of Examples 1-6 further includes that the phased array repeater includes a shared LNA and a shared PA.

In Example 8, the method of any of Examples 1-7 further includes generating a double sideband (DSB) signal including a pair of single sidebands (SSBs) by heterodyning, wherein one of the pair of SSBs is at the second frequency; and selecting one sideband from the pair of SSBs generated by heterodyning.

In Example 9, the method of any of Examples 1-8 further includes receiving, from the base station, control information regarding adjusting the first frequency of the signal, wherein the signal at the second frequency is selected from one of the pair of SSBs based on the control information.

In Example 10, the method of any of Examples 1-9 further includes filtering the signal from the base station prior to adjusting the first frequency to the second frequency.

In Example 11, the method of any of Examples 1-10 further includes that the adjustment to the first frequency is based on a clock at the phased array repeater and a reference clock received from the base station.

In Example 12, the method of any of Examples 1-11 further includes that the adjustment to the first frequency is based on a ratio of programmable variables received from the base station.

In Example 13, the method of any of Examples 1-12 further includes that the signal is received via a first antenna array, wherein the signal is transmitted via a second antenna array, and wherein two or more heterodyners are between the first antenna array and the second antenna array.

In Example 14, the method of any of Examples 13 further includes that the signal is received, adjusted, or transmitted via one or more components including an antenna array, a switch, a coupler, a combiner or splitter, a filter, a phase-shifter, a duplexer, an oscillator, or a connecting element, wherein the one or more components comprise a meta-material or at least one material with a tunable permittivity or permeability.

Example 15 is a device including one or more processors and one or more memories in electronic communication with the one or more processors storing instructions executable by the one or more processors to cause the device to implement a method as in any of Examples 1-14.

Example 16 is a system or apparatus including means for implementing a method or realizing an apparatus as in any of Examples 1-14.

Example 17 is a non-transitory computer readable medium storing instructions executable by one or more processors to cause the one or more processors to implement a method as in any of Examples 1-14.

Example 18 is a method of wireless communication, comprising transmitting a signal for a user equipment (UE) at a first frequency; determining control information for tuning a frequency adjustment of the signal at a repeater; and transmitting, to the repeater, the control information for tuning the frequency adjustment.

In Example 19, the method of Example 18 further includes that the control information includes information regarding adjusting the first frequency to a second frequency.

In Example 20, the method of Example 18 or 19 further includes that the signal is transmitted via a first link based on a first radio access technology (RAT), and wherein the frequency control information is transmitted via a second link based on a second RAT.

In Example 21, the method of any of Examples 18-20 further includes that the first RAT comprises millimeter wave (mmW) communication, and wherein the second RAT comprises one of narrowband internet of things (NB-IoT) communication, Wi-Fi communication, or Bluetooth communication, or a communication at a frequency lower than mmW frequency.

In Example 22, the method of any of Examples 18-21 further includes that the signal is transmitted via one or more components including an antenna array, a switch, a coupler, a combiner or splitter, a filter, a phase-shifter, a duplexer, an oscillator, or a connecting element, wherein the one or more components comprise a meta-material or at least one material with a tunable permittivity or permeability.

In Example 23, the method of any of Examples 18-22 further includes that the repeater is a phased array repeat.

Example 24 is a device including one or more processors and one or more memories in electronic communication with the one or more processors storing instructions executable by the one or more processors to cause the device to implement a method as in any of Examples 18-23.

Example 25 is a system or apparatus including means for implementing a method or realizing an apparatus as in any of Examples 18-23.

Example 26 is a non-transitory computer readable medium storing instructions executable by one or more processors to cause the one or more processors to implement a method as in any of Examples 18-23.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication of a phased array repeater, comprising:
   receiving, from a network entity, a first signal for a user equipment (UE) at a first frequency;
   receiving, from the network entity, a second signal including frequency tuning information for a tunable frequency synthesizer, the second signal having a different frequency range or a different radio access technology (RAT) than the first signal;
   tuning a variable local oscillator (LO) frequency at the tunable frequency synthesizer based on the frequency tuning information to tune a frequency separation between the first frequency and the second frequency;
   adjusting, at the phased array repeater, the first frequency of the first signal to a second frequency, wherein the first frequency is adjusted by heterodyning based on the variable LO frequency from the tunable frequency synthesizer; and
   transmitting, to the UE, the first signal at the second frequency,
   wherein the adjustment to the first frequency is based on a clock at the phased array repeater and a reference clock received from the network entity; or
   wherein the frequency tuning information from the network entity includes multiple programmable variables, and the heterodyning to adjust to the first frequency to the second frequency is based on the variable LO frequency from the tunable frequency synthesizer after tuning based on a ratio of the multiple programmable variables received from the network entity.

2. The method of claim 1, wherein a frequency adjustment to the first frequency is tunable based on tuning the variable LO frequency applied in the heterodyning, such that the frequency separation between the first frequency and the second frequency can be adjusted.

3. The method of claim 1, wherein the first signal is received from the network entity via a first link based on a first radio access technology (RAT), and wherein the second signaling including the frequency tuning information is received from the network entity via a second link based on a second RAT.

4. The method of claim 3, wherein the first RAT comprises millimeter wave (mmW) communication, and wherein the second RAT comprises one of narrowband internet of things (NB-IoT) communication, Wi-Fi communication, Bluetooth communication, or a communication at a frequency lower than mmW frequency.

5. The method of claim 1, wherein the phased array repeater includes one or more distributed low noise amplifiers (LNAs) and one or more distributed power amplifiers (PAs).

6. The method of claim 5, wherein the phased array repeater includes a shared LNA and a shared PA.

7. The method of claim 1, further comprising:
   generating a double sideband (DSB) signal including a pair of single sidebands (SSBs) by the heterodyning, wherein one of the pair of SSBs is at the second frequency; and
   selecting one sideband from the pair of SSBs generated by the heterodyning.

8. The method of claim 7, further comprising:
   receiving, from the network entity, control information regarding adjusting the first frequency of the first signal, wherein the first signal at the second frequency is selected from one of the pair of SSBs based on the control information.

9. The method of claim 1, further comprising:
   filtering the first signal from the network entity prior to adjusting the first frequency to the second frequency; and
   filtering the first signal after adjusting the first frequency to the second frequency and prior to transmitting the first signal to the UE.

10. The method of claim 1, wherein the adjusting the first frequency is based on the clock at the phased array repeater and the reference clock received from the network entity.

11. The method of claim 1, wherein the frequency tuning information from the network entity includes the multiple programmable variables, and the heterodyning to adjust to the first frequency to the second frequency is based on the variable LO frequency from the tunable frequency synthesizer after tuning based on the ratio of the multiple programmable variables received from the network entity.

12. The method of claim 1, wherein the first signal is received via a first antenna array, wherein the second signal is transmitted via a second antenna array, and wherein two or more heterodyners are between the first antenna array and the second antenna array.

13. The method of claim 1, wherein the first signal is received, adjusted, or transmitted via one or more components including an antenna array, a switch, a coupler, a combiner or splitter, a filter, a phase-shifter, a duplexer, an oscillator, or a connecting element, wherein the one or more components comprise a meta-material or at least one material with a tunable permittivity or permeability.

14. A method for wireless communication, comprising:
   transmitting a first signal for a user equipment (UE) at a first frequency;
   determining frequency tuning information for tuning a tunable frequency synthesizer at a repeater; and
   transmitting, to the repeater, a second signal including the frequency tuning information for tuning the tunable frequency synthesizer, wherein the frequency tuning information includes information indicating an adjustment of the first frequency to a second frequency, the second signal having a different frequency range or a different radio access technology (RAT) than the first signal,
   wherein the adjustment to the first frequency is based on a clock at the repeater and a reference clock; or
   wherein the frequency tuning information includes multiple programmable variables, and the adjustment to the first frequency is based on a variable local oscillator (LO) frequency of the tunable frequency synthesizer after tuning based on a ratio of the multiple programmable variables.

15. The method of claim 14, wherein the first signal is transmitted via a first link based on a first radio access technology (RAT), and wherein the second signaling including the frequency tuning information is transmitted via a second link based on a second RAT.

16. The method of claim 15, wherein the first RAT comprises millimeter wave (mmW) communication, and wherein the second RAT comprises one of narrowband internet of things (NB-IoT) communication, Wi-Fi communication, or Bluetooth communication, or a communication at a frequency lower than mmW frequency.

17. The method of claim 14, wherein the first signal is transmitted via one or more components including an antenna array, a switch, a coupler, a combiner or splitter, a filter, a phase-shifter, a duplexer, an oscillator, or a connecting element, wherein the one or more components comprise a meta-material or at least one material with a tunable permittivity or permeability.

18. The method of claim 14, wherein the repeater is a phased array repeater.

19. The method of claim 14, wherein the adjustment to the first frequency is based on the clock at the repeater and the reference clock.

20. The method of claim 14, wherein the frequency tuning information includes the multiple programmable variables, and the adjustment to the first frequency is based on the variable LO frequency of the tunable frequency synthesizer after the tuning based on the ratio of the multiple programmable variables.

21. An apparatus for wireless communication of a phased array repeater, comprising:
a memory; and
at least one processor coupled to the memory and configured to:
receive, from a network entity, a first signal for a user equipment (UE) at a first frequency;
receive, from the network entity, a second signal including frequency tuning information for a tunable frequency synthesizer, the second signal having a different frequency range or a different radio access technology (RAT) than the first signal;
tune a variable local oscillator (LO) frequency at the tunable frequency synthesizer based on the frequency tuning information to tune a frequency separation between the first frequency and the second frequency;
adjust, at the phased array repeater, the first frequency of the first signal to a second frequency, wherein the first frequency is adjusted by heterodyning based on the variable LO frequency from the tunable frequency synthesizer; and
transmit, to the UE, the first signal at the second frequency,
wherein an adjustment to the first frequency is based on a clock at the phased array repeater and a reference clock received from the network entity; or
wherein the frequency tuning information from the network entity includes multiple programmable variables, and the heterodyning to adjust to the first frequency to the second frequency is based on the variable LO frequency from the tunable frequency synthesizer after tuning based on a ratio of the multiple programmable variables received from the network entity.

22. The apparatus of claim 21, wherein a frequency adjustment to the first frequency is tunable based on tuning the variable LO frequency applied in the heterodyning, such that the frequency separation between the first frequency and the second frequency can be adjusted.

23. The apparatus of claim 21, wherein the memory and the at least one processor are further configured to receive the first signal from the network entity via a first link based on a first radio access technology (RAT), and to receive the second signal including the frequency tuning information from the network entity via a second link based on a second RAT.

24. The apparatus of claim 23, wherein the first RAT comprises millimeter wave (mmW) communication, and wherein the second RAT comprises one of narrowband internet of things (NB-IoT) communication, Wi-Fi communication, or Bluetooth communication, or a communication at a frequency lower than mmW frequency.

25. The apparatus of claim 21, wherein the phased array repeater includes one or more distributed low noise amplifiers (LNAs) and one or more distributed power amplifiers (PAs).

26. The apparatus of claim 21, wherein the at least one processor is further configured to:
generate a double sideband (DSB) signal including a pair of sidebands (SSBs) by the heterodyning, wherein one of the pair of SSBs is at the second frequency; and
select one sideband from the pair of SSBs generated by the heterodyning.

27. The apparatus of claim 26, wherein the at least one processor is further configured to:
receive, from the network entity, control information regarding adjusting the first frequency of the first signal, wherein the first signal at the second frequency is selected from one of the pair of SSBs based on the control information;
filter the first signal from the network entity prior to adjusting the first frequency to the second frequency; and
filter the first signal after adjusting the first frequency to the second frequency and prior to transmitting the first signal to the UE.

28. The apparatus of claim 21, wherein the adjustment to the first frequency is based on the clock at the phased array repeater and the reference clock received from the network entity.

29. The apparatus of claim 21, further comprising:
an antenna array comprising a meta-material; and
a transceiver coupled to the antenna array and the at least one processor, wherein the at least one processor is configured to transmit the first signal to the UE via the transceiver and the antenna array.

30. The apparatus of claim 21, wherein the frequency tuning information from the network entity includes the multiple programmable variables, and the heterodyning to adjust to the first frequency to the second frequency is based on the variable LO frequency from the tunable frequency synthesizer after the tuning based on the ratio of the multiple programmable variables received from the network entity.

31. An apparatus for wireless communication, comprising:
a memory; and
at least one processor coupled to the memory and configured to:
transmit a first signal for a user equipment (UE) at a first frequency;
determine frequency tuning information for tuning a tunable frequency synthesizer at a repeater; and
transmit, to the repeater, a second signal including the frequency tuning information for tuning the tunable frequency synthesizer, wherein the frequency tuning information includes information regarding adjusting the first frequency to a second frequency, the second signal having a different frequency range or a different radio access technology (RAT) than the first signal, wherein an adjustment to the first frequency is based on a clock at the repeater and a reference clock; or wherein the frequency tuning information includes multiple programmable variables, and the adjustment to the first frequency is based on a variable local oscillator (LO) frequency of the tunable frequency synthesizer after tuning based on a ratio of the multiple programmable variables.

32. The apparatus of claim 31, wherein the adjustment to the first frequency is based on the clock at the repeater and the reference clock.

33. The apparatus of claim 31, wherein the frequency tuning information includes the multiple programmable variables, and the adjustment to the first frequency is based on the variable LO frequency of the tunable frequency synthesizer after the tuning based on the ratio of the multiple programmable variables.

* * * * *